US011176957B2

(12) United States Patent
Graf et al.

(10) Patent No.: US 11,176,957 B2
(45) Date of Patent: Nov. 16, 2021

(54) LOW COMPLEXITY DETECTION OF VOICED SPEECH AND PITCH ESTIMATION

(71) Applicant: Cerence Operating Company, Burlington, MA (US)

(72) Inventors: Simon Graf, Ulm (DE); Tobias Herbig, Ulm (DE); Markus Buck, Biberach (DE)

(73) Assignee: Cerence Operating Company, Burlington, MA (US)

( * ) Notice: Subject to any disclaimer, the term of this patent is extended or adjusted under 35 U.S.C. 154(b) by 11 days.

(21) Appl. No.: 16/638,866

(22) PCT Filed: Aug. 17, 2017

(86) PCT No.: PCT/US2017/047361
§ 371 (c)(1),
(2) Date: Feb. 13, 2020

(87) PCT Pub. No.: WO2019/035835
PCT Pub. Date: Feb. 21, 2019

(65) Prior Publication Data
US 2021/0134311 A1 May 6, 2021

(51) Int. Cl.
*G10L 21/02* (2013.01)
*G10L 21/013* (2013.01)
(Continued)

(52) U.S. Cl.
CPC ............ *G10L 21/02* (2013.01); *G10L 21/013* (2013.01); *G10L 21/034* (2013.01); *G10L 25/18* (2013.01); *G10L 25/84* (2013.01); *G10L 25/90* (2013.01)

(58) Field of Classification Search
CPC .... G10L 21/013; G10L 21/02; G10L 21/0232
See application file for complete search history.

(56) References Cited

U.S. PATENT DOCUMENTS 6,006,178 A * 12/1999 Taumi .................. G10L 19/083 704/222
6,885,986 B1 * 4/2005 Gigi ....................... G10L 25/90 704/207

(Continued)

FOREIGN PATENT DOCUMENTS

JP H08044395 A 2/1996
JP 2000122698 A 4/2000

(Continued)

OTHER PUBLICATIONS

Mohamed Krimi et al., "Spectral Refinement and its Application to fundamental Frequency Estimation," Applications of Signal Processing to Audio and Acoustics, 2007 IEEE Workshop, Oct. 1, 2007, pp. 251-254.

*Primary Examiner* — Shaun Roberts
(74) *Attorney, Agent, or Firm* — Occhiuti & Rohlicek LLP

(57) ABSTRACT

A low-complexity method and apparatus for detection of voiced speech and pitch estimation is disclosed that is capable of dealing with special constraints given by applications where low latency is required, such as in-car communication (ICC) systems. An example embodiment employs very short frames that may capture only a single excitation impulse of voiced speech in an audio signal. A distance between multiple such impulses, corresponding to a pitch period, may be determined by evaluating phase differences between low-resolution spectra of the very short frames. An example embodiment may perform pitch estimation directly in a frequency domain based on the phase differences and reduce computational complexity by obviating transformation to a time domain to perform the pitch estimation. In an event the phase differences are determined to be substantially linear, an example embodiment enhances (Continued)

voice quality of the voiced speech by applying speech enhancement to the audio signal.

20 Claims, 18 Drawing Sheets

(51) Int. Cl.

| | |
|---|---|
| ***G10L 21/034*** | (2013.01) |
| ***G10L 25/18*** | (2013.01) |
| ***G10L 25/84*** | (2013.01) |
| ***G10L 25/90*** | (2013.01) |

(56) References Cited

U.S. PATENT DOCUMENTS

2004/0193407 A1* 9/2004 Ramabadran ........... G10L 25/90 704/207
2008/0095384 A1* 4/2008 Son ......................... G10L 25/87 381/94.1
2008/0189118 A1* 8/2008 Lee ....................... G10L 19/022 704/500
2011/0288860 A1 11/2011 Schevciw et al.
2013/0179163 A1* 7/2013 Herbig ................... H04R 27/00 704/233
2013/0275873 A1* 10/2013 Shaw ...................... G06F 3/167 715/716
2013/0282373 A1* 10/2013 Visser ................. G10L 21/0316 704/233
2015/0078571 A1* 3/2015 Kurylo ................... H04R 3/005 381/71.8
2016/0284349 A1* 9/2016 Ravindran .............. G10L 15/20

FOREIGN PATENT DOCUMENTS

JP 2004297273 A 10/2004
JP 2005084660 A 3/2005
JP 2007140000 A 6/2007
JP 2009522942 A 6/2009
JP 201133717 A 2/2011
JP 2013531419 A 8/2013
WO 2004084187 A1 9/2004
WO WO 2006/079813 8/2006
WO 2014136628 A1 9/2014
WO WO 2014/194273 12/2014

* cited by examiner

LOW COMPLEXITY DETECTION OF VOICED SPEECH AND PITCH ESTIMATION

CROSS REFERENCE TO RELATED APPLICATION

This application is the national phase under 35 USC 371 of international application no. PCT/US2017/047361, filed Aug. 17, 2017.

BACKGROUND

An objective of speech enhancement is to improve speech quality, such as by improving intelligibility and/or overall perceptual quality of a speech signal that may be degraded, for example, by noise. Various audio signal processing methods aim to improve speech quality. Such audio signal processing methods may be employed by many audio communications applications such as mobile phones, Voice over Internet Protocol (VoIP), teleconferencing systems, speech recognition, or any other audio communications application.

SUMMARY

According to an example embodiment, a method for voice quality enhancement in an audio communications system may comprise monitoring for a presence of voiced speech in an audio signal including the voiced speech and noise captured by the audio communications system. At least a portion of the noise may be at frequencies associated with the voiced speech. The monitoring may include computing phase differences between respective frequency domain representations of present audio samples of the audio signal in a present short window and of previous audio samples of the audio signal in at least one previous short window. The method may comprise determining whether the phase differences computed between the respective frequency domain representations are substantially linear over frequency. The method may comprise detecting the presence of the voiced speech by determining that the phase differences computed are substantially linear and, in an event the voiced speech is detected, enhancing voice quality of the voiced speech communicated via the audio communications system by applying speech enhancement to the audio signal.

It should be understood that the phase differences computed between the respective frequency domain representations may be substantially linear over frequency with local variations throughout. For example, the phase differences computed follow, approximately, a linear line with deviations above and below the linear line. The phase differences computed may be considered to be substantially linear if the phase differences follow, on average, the linear line, such as disclosed further below with regard to FIG. 6 and FIG. 7F. Substantially linear may be defined as a low variance of the slope of the phase over frequency. The low variance may correspond to a variance such as +/−1%, +/−5%, +/−10%, or any other suitable value consistent within an acceptable margin for a given environmental condition. A range for the low variance may be changed, dynamically, for the environmental condition. According to an example embodiment, the low variance may correspond to a threshold value, such as the threshold value disclosed below with regard to Eq. (13), and may be employed to determine whether the phase differences computed are substantially linear.

The present and at least one previous short window may have a window length that is too short to capture audio samples of a full period of a periodic voiced excitation impulse signal of the voiced speech in the audio signal.

The audio communications system may be an in-car-communications (ICC) system and the window length may be set to reduce audio communication latency in the ICC system.

The method may further comprise estimating a pitch frequency of the voiced speech, directly in a frequency domain, based on the presence being detected and the phase differences computed.

The computing may include computing a weighted sum over frequency of phase relations between neighboring frequencies of a normalized cross-spectrum of the respective frequency domain representations and computing a mean value of the weighted sum computed. The determining may include comparing a magnitude of the mean value computed to a threshold value representing linearity to determine whether the phase differences computed are substantially linear.

The mean value may be a complex number and, in an event the phase differences computed are determined to be substantially linear, the method may further comprise estimating a pitch period of the voiced speech, directly in a frequency domain, based on an angle of the complex number.

The method may include comparing the mean value computed to other mean values each computed based on the present short window and a different previous short window and estimating a pitch frequency of the voiced speech, directly in a frequency domain, based on an angle of a highest mean value, the highest mean value selected from amongst the mean value and other mean values based on the comparing.

Computing the weighted sum may include employing weighting coefficients at frequencies in a frequency range of voiced speech and applying a smoothing constant in an event the at least one previous frame includes multiple frames.

The method may further comprise estimating a pitch frequency of the voiced speech, directly in a frequency domain, based on the presence being detected. The computing may include computing a normalized cross-spectrum of the respective frequency domain representations. The estimating may include computing a slope of the normalized cross-spectrum computed and converting the slope computed to the pitch period.

The method may further comprise estimating a pitch frequency of the voiced speech, directly in a frequency domain, based on the presence being detected and the phase differences computed and applying an attenuation factor to the audio signal based on the presence not being detected. The speech enhancement may include reconstructing the voiced speech based on the pitch frequency estimated, disabling noise tracking, applying an adaptive gain to the audio signal, or a combination thereof.

According to another example embodiment, an apparatus for voice quality enhancement in an audio communications system may comprise an audio interface configured to produce an electronic representation of an audio signal including voiced speech and noise captured by the audio communications system. At least a portion of the noise may be at frequencies associated with the voiced speech. The apparatus may comprise a processor coupled to the audio interface. The processor may be configured to implement a speech detector and an audio enhancer. The speech detector may be coupled to the audio enhancer and configured to monitor for a presence of the voiced speech in the audio signal. The monitor operation may include computing phase differences between respective frequency domain representations of present audio samples of the audio signal in a present short window and of previous audio samples of the audio signal in at least one previous short window. The speech detector may be configured to determine whether the phase differences computed between the respective frequency domain representations are substantially linear over frequency. The speech detector may be configured to detect the presence of the voiced speech by determining that the phase differences computed are substantially linear and communicate an indication of the presence to the audio enhancer. The audio enhancer may be configured to enhance voice quality of the voiced speech communicated via the audio communications system by applying speech enhancement to the audio signal, the speech enhancement based on the indication communicated.

The present and at least one previous short window may have a window length that is too short to capture audio samples of a full period of a periodic voiced excitation impulse signal of the voiced speech in the audio signal, the audio communications system may be an in-car-communications (ICC) system, and the window length may be set to reduce audio communication latency in the ICC system.

The speech detector may be further configured to estimate a pitch frequency of the voiced speech, directly in a frequency domain, based on the presence being detected and the phase differences computed.

The compute operation may include computing a weighted sum over frequency of phase relations between neighboring frequencies of a normalized cross-spectrum of the respective frequency domain representations and computing a mean value of the weighted sum computed. The determining operation may include comparing a magnitude of the mean value computed to a threshold value representing linearity to determine whether the phase differences computed are substantially linear.

The mean value may be a complex number and, in an event the phase differences computed are determined to be substantially linear, the speech detector may be further configured to estimate a pitch period of the voiced speech, directly in a frequency domain, based on an angle of the complex number.

The speech detector may be further configured to compare the mean value computed to other mean values each computed based on the present short window and a different previous short window and estimate a pitch frequency of the voiced speech, directly in a frequency domain, based on an angle of a highest mean value, the highest mean value selected from amongst the mean value and other mean values based on the compare operation.

To compute the weighted sum, the speech detector may be further configured to employ weighting coefficients at frequencies in a frequency range of voiced speech and apply a smoothing constant in an event the at least one previous frame includes multiple frames.

The speech detector may be further configured to estimate a pitch frequency of the voiced speech, directly in a frequency domain, based on the presence being detected. The compute operation may include computing a normalized cross-spectrum of the respective frequency domain representations. The estimation operation may include computing a slope of the normalized cross-spectrum computed and converting the slope computed to the pitch period.

The speech detector may be further configured to estimate a pitch frequency of the voiced speech, directly in a frequency domain, based on the presence being detected and the phase differences computed and to communicate the pitch frequency estimated to the audio enhancer. The audio enhancer may be further configured to apply an attenuation factor to the audio signal based on the indication communicated indicating absence of the voiced speech. The speech enhancement may include reconstructing the voiced speech based on the pitch frequency estimated and communicated, disabling noise tracking, applying an adaptive gain to the audio signal, or a combination thereof.

Yet another example embodiment may include a non-transitory computer-readable medium having stored thereon a sequence of instructions which, when loaded and executed by a processor, causes the processor to complete methods disclosed herein.

It should be understood that embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
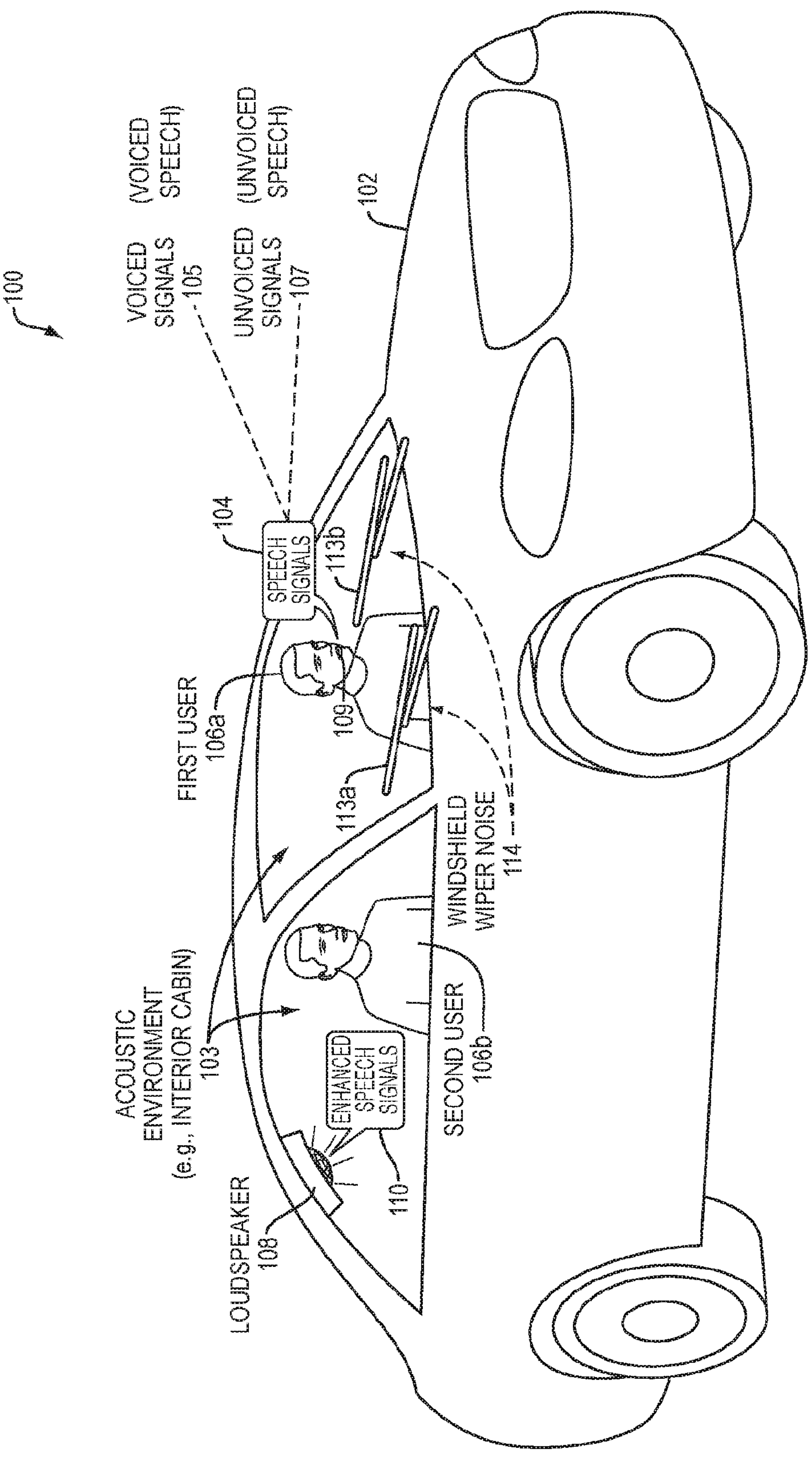
FIG. 1A is a diagram of an example embodiment of a car in which an example embodiment of an in-car-communication (ICC) system may be employed.

A description of example embodiments follows.

Detection of voiced speech and estimation of a pitch frequency thereof are important tasks for many speech processing methods. Voiced speech is produced by the vocal cords and vocal tract including a mouth and lips of a speaker. The vocal tract acts as a resonator that spectrally shapes the voiced excitation produced by the vocal cords. As such, the voiced speech is produced when the speaker's vocal cords vibrate while speaking, whereas unvoiced speech does not entail vibration of the speaker's vocal cords. A pitch of a voice may be understood as a rate of vibration of the vocal cords, also referred to as vocal folds. A sound of the voice changes as a rate of vibration varies. As a number of vibrations per second increases, so does the pitch, causing the voice to have a higher sound. Pitch information, such as a pitch frequency or period, may be used, for example, to reconstruct voiced speech corrupted or masked by noise.

In automotive environments, driving noise may especially affect voiced speech portions as it may be primarily present at lower frequencies typical of the voiced speech portions. Pitch estimation is, therefore, important, for example, for in-car-communication (ICC) systems. Such systems may amplify a speaker's voice, such as a driver's or backseat passenger's voice, and allow for convenient conversations between the driver and the backseat passenger. Low latency is typically required for such an ICC application; thus, the ICC application may employ short frame lengths and short frame shifts between consecutive frames (also referred to interchangeably herein as "windows"). Conventional pitch estimation techniques; however, rely on long windows that exceed a pitch period of human speech. In particular, male speakers' low pitch frequencies are difficult to resolve in low-latency applications using conventional pitch estimation techniques.

An example embodiment disclosed herein considers a relation between multiple short windows that can be evaluated very efficiently. By taking into account the relation between multiple short windows instead of relying on a single long window, usual challenges, such as short windows and low pitch frequencies for male speakers, may be resolved according to the example embodiment. An example embodiment of a method may estimate pitch frequency over a wide range of pitch frequencies. In addition, a computational complexity of the example embodiment may be low relative to conventional pitch estimation techniques as the example embodiment may estimate pitch frequency directly in a frequency domain obviating computational complexity of conventional pitch estimation techniques that may compute an Inverse Discrete Fourier Transform (IDFT) to convert back to a time domain for pitch estimation. As such, an example embodiment may be referred to herein as being a low-complex method or a low-complexity method.

An example embodiment may employ a spectral representation (i.e., spectrum) of an input audio signal that is already computed for other applications in an ICC system. Since very short windows may be used for ICC applications in order to meet low-latency requirements for communications, a frequency resolution of the spectrum may be low, and it may not be possible to determine pitch based on a single frame. An example embodiment disclosed herein may focus on phase differences between multiple of these low resolution spectra.

Considering a harmonic excitation of voiced speech as a periodic repetition of peaks, a distance between the peaks may be expressed by a delay. In a spectral domain, the delay corresponds to a linear phase. An example embodiment may test the phase difference between multiple spectra, such as two spectra, for linearity to determine whether harmonic components can be detected. Furthermore, an example embodiment may estimate a pitch period based on a slope of the linear phase difference.

According to an example embodiment, pitch information may be extracted from an audio signal based on phase differences between multiple low-resolution spectra instead of a single long window. Such an example embodiment benefits from a high temporal resolution provided by the short frame shift and is capable of dealing with the low spectral resolution caused by short window lengths. By employing such an example embodiment, even very low pitch frequencies may be estimated very efficiently.

FIG. 1A is a diagram 100 of an example embodiment of a car 102 in which an example embodiment of an ICC system (not shown) may be employed. The ICC system supports a communications path (not shown) within the car 102 and receives speech signals 104 of a first user **106*a* via a microphone (not shown) and plays back enhanced speech signals 110 on a loudspeaker 108 for a second user 106*b*. A microphone signal (not shown) produced by the microphone may include both the speech signals 104 as well as noise signals (not shown) that may be produced in an acoustic environment 103, such as the interior cabin of the car 102**.

The microphone signal may be enhanced by the ICC system based on differentiating acoustic noise produced in the acoustic environment 103, such as windshield wiper noise 114 produced by the windshield wiper **113*a* or 113*b* or other acoustic noise produced in the acoustic environment 103 of the car 102, from the speech signals 104 to produce the enhanced speech signals 110 that may have the acoustic noise suppressed. It should be understood that the communications path may be a bi-directional path that also enables communication from the second user 106*b* to the first user 106*a*. As such, the speech signals 104 may be generated by the second user 106*b* via another microphone (not shown) and the enhanced speech signals 110 may be played back on another loudspeaker (not shown) for the first user 106*a*. It should be understood that acoustic noise produced in the acoustic environment 103 of the car 102** may include environmental noise that originates outside of the cabin, such as noise from passing cars, or any other environmental noise.

The speech signals 104 may include voiced signals 105 and unvoiced signals 107. The speaker's speech may be composed of voiced phonemes, produced by the vocal cords (not shown) and vocal tract including the mouth and lips 109 of the first user 106*a*. As such, the voiced signals 105 may be produced when the speaker's vocal cords vibrate during pronunciation of a phoneme. The unvoiced signals 107, by contrast, do not entail vibration of the speaker's vocal cords. For example, a difference between the phonemes /s/ and /z/ or /f/ and /v/ is vibration of the speaker's vocal cords. The voiced signals 105 may tend to be louder like the vowels /a/, /e/, /i/, /u/, /o/, than the unvoiced signals 107. The unvoiced signals 107, on the other hand, may tend to be more abrupt, like the stop consonants /p/, /t/, /k/.

It should be understood that the car 102 may be any suitable type of transport vehicle and that the loudspeaker 108 may be any suitable type of device used to deliver the enhanced speech signals 110 in an audible form for the second user 106*b*. Further, it should be understood that the enhanced speech signals 110 may be produced and delivered in a textual form to the second user 106*b* via any suitable type of electronic device and that such textual form may be produced in combination with or in lieu of the audible form.

An example embodiment disclosed herein may be employed in an ICC system, such as disclosed in FIG. 1A, above, to produce the enhanced speech signals 110. An example embodiment disclosed herein may be employed by speech enhancement techniques that process the microphone signal including the speech signals 104 and acoustic noise of the acoustic environment 103 and generate the enhanced speech signals 110 that may be adjusted to the acoustic environment 103 of the car 102.

Speech enhancement techniques are employed in many speech-driven applications. Based on a speech signal that is corrupted with noise, these speech enhancement techniques try to recover the original speech. In many scenarios, such as automotive applications, the noise is concentrated at the lower frequencies. Speech portions in this frequency region are particularly affected by the noise.

Human speech comprises voiced as well as unvoiced phonemes. Voiced phonemes exhibit a harmonic excitation structure caused by periodic vibrations of the vocal folds. In a time domain, this voiced excitation is characterized by a sequence of repetitive impulse-like signal components. Valuable information is contained in the pitch frequency, such as information on the speaker's identity or the prosody. It is, therefore, desirable for many applications, such as the ICC application disclosed above with regard to FIG. 1A, to detect a presence of voiced speech and to estimate the pitch frequency (A. de Cheveigné and H. Kawahara, "YIN, a fundamental frequency estimator for speech and music," The Journal of the Acoustical Society of America, vol. 111, no. 4, p. 1917, 2002; S. Gonzalez and M. Brookes, "A pitch estimation filter robust to high levels of noise (PEFAC)," in Proc. of EUSIPCO, Barcelona, Spain, 2011; B. S. Lee and D. P. Ellis, "Noise robust pitch tracking by subband autocorrelation classification," in Proc. of Interspeech, Portland, Oreg., USA, 2012; F. Kurth, A. Cornaggia-Urrigshardt, and S. Urrigshardt, "Robust FO Estimation in Noisy Speech Signals Using Shift Autocorrelation," in Proc. of ICASSP, Florence, Italy, 2014.)

Figure 2:
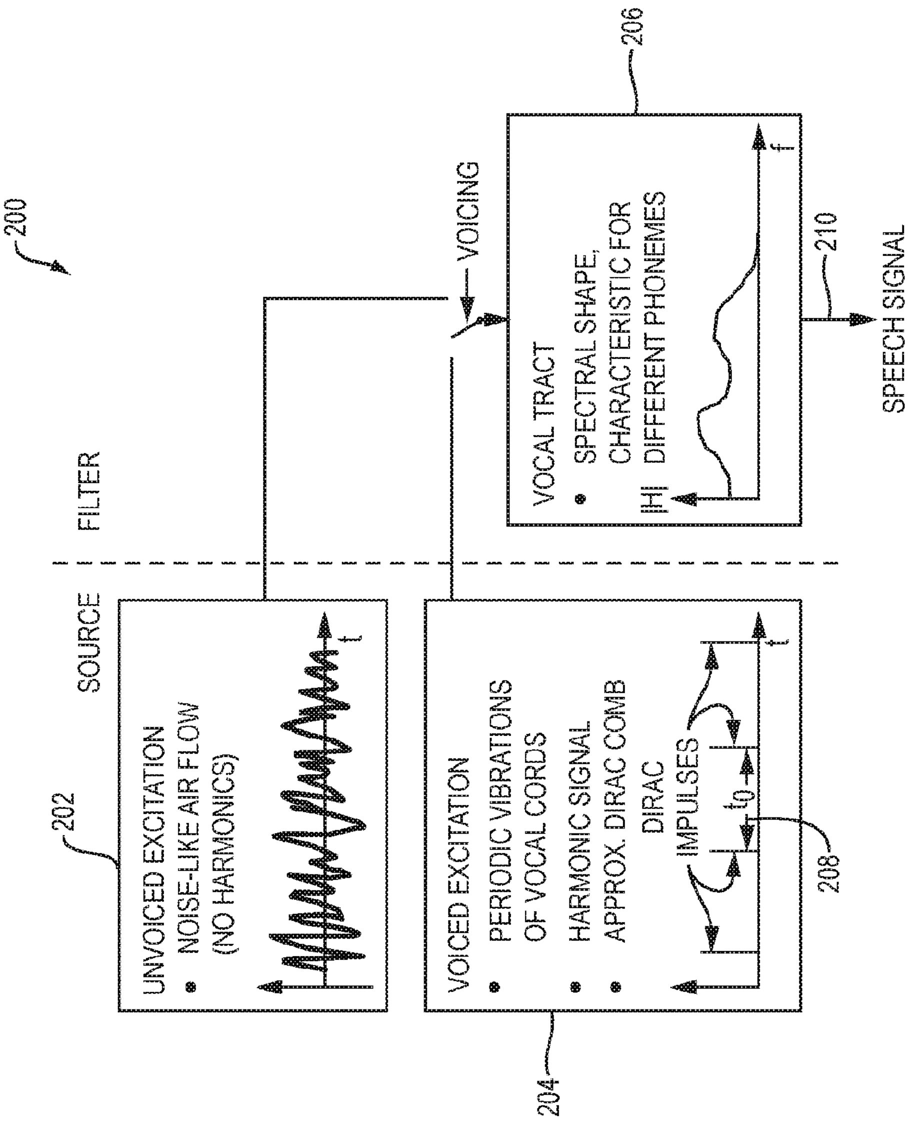
FIG. 2 is a block diagram of an example embodiment of speech production.

FIG. 2 is a block diagram 200 of an example embodiment of speech production. The speech signal 210 is typical of human speech that is composed of voiced and unvoiced phonemes, as disclosed above. The block diagram 200 includes plots of an unvoiced excitation 202, voiced excitation 204, and vocal tract filter 206. As disclosed above, excitations are different for voiced and unvoiced phoneme. The plot of the unvoiced excitation 202 exhibits no harmonics while the plot of the voiced excitation 204 is characterized by harmonic components with a pitch period 208 of $t_0$ and pitch frequency $f_0=1/t_0$.

Figure 3:
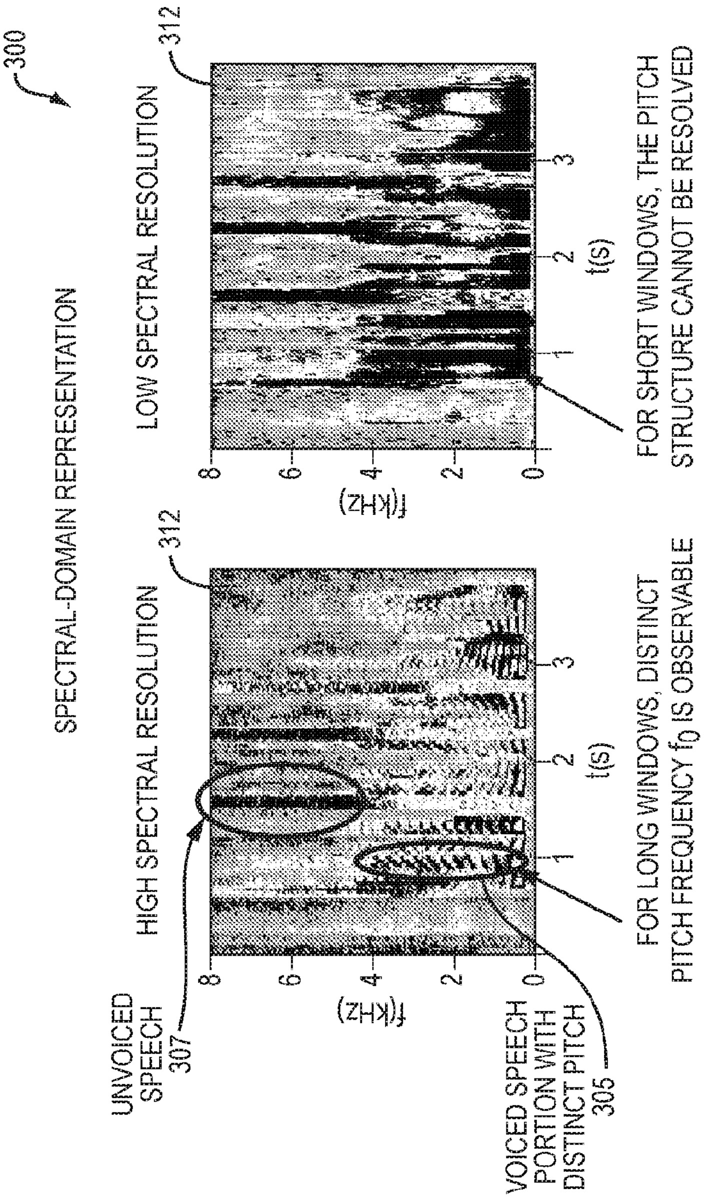
FIG. 3 is a spectral-domain representation of an example embodiment of an audio signal that includes voiced speech.

FIG. 3 is a spectral-domain representation 300 of an example embodiment of an audio signal that includes voiced speech 305. In the example embodiment, a complete utterance is captured that also includes unvoiced speech 307. The spectral-domain representation 300 includes a high spectral resolution representation 312 and a low spectral resolution representation 314. In the high spectral resolution representation 312, a distinct pitch frequency, such as the pitch frequency $f_0$ disclosed above with regard to FIG. 2, is observable. However, in the low spectral resolution representation 314 the pitch structure cannot be resolved. The low spectral resolution representation 314 may be typical for a short window employed in an audio communications system requiring low-latency communications, such as the ICC system disclosed above with regard to FIG. 1A.

Figure 4:
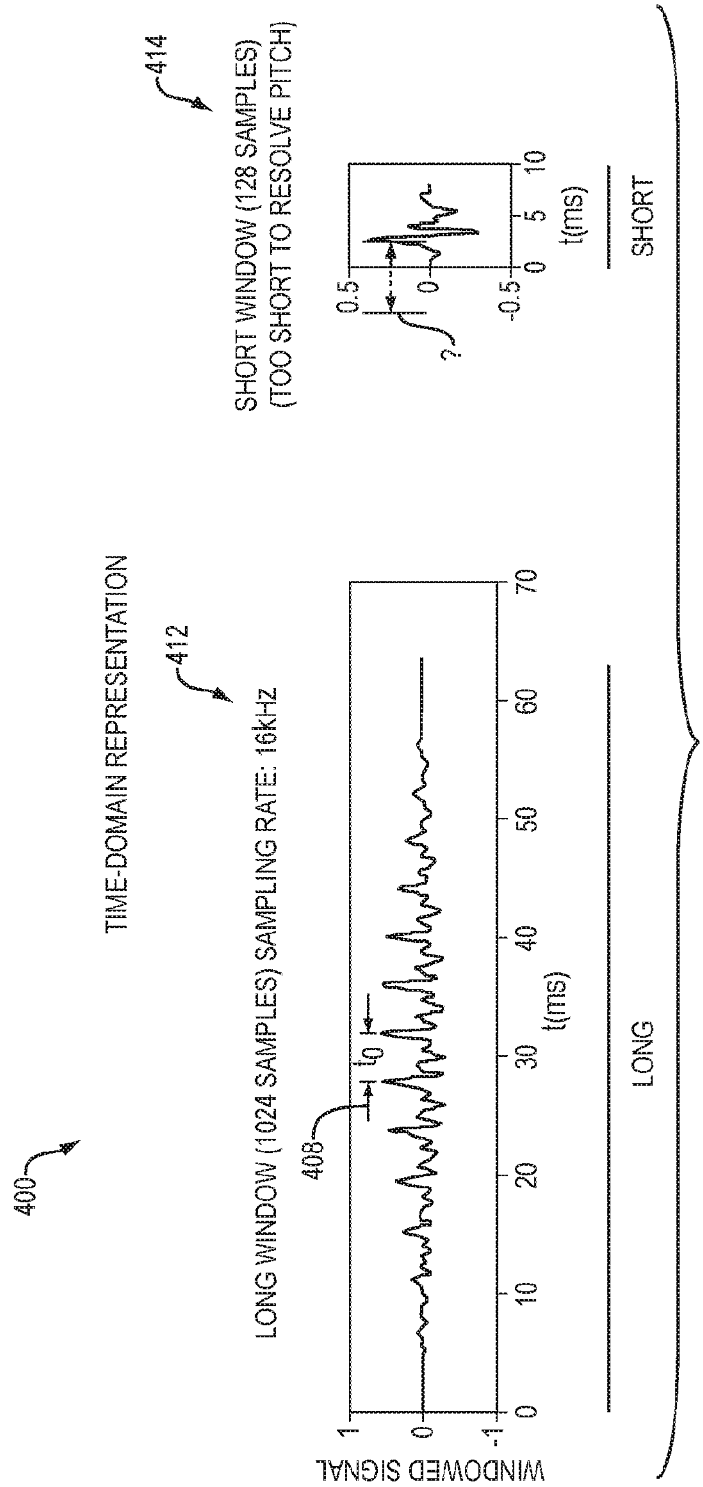
FIG. 4 is a time-domain representation of an example embodiment of a long window and a short window of audio samples of an electronic representation of an interval of an audio signal that captures a voiced phoneme.

FIG. 4 is a time-domain representation 400 of an example embodiment of a long window 412 and a short window 414 of audio samples of an electronic representation of an interval of an audio signal that captures a voiced phoneme. In the long window 412, a pitch period 408 is captured. However, the short window 414 is too short to capture one pitch period. In this case pitch cannot be estimated with conventional methods based on a single frame as the short window 414 is too short to resolve the pitch. An example embodiment employs multiple short frames (i.e., windows) to extend a temporal context.

Typically, long window lengths are required to resolve the pitch frequency accurately. Multiple excitation impulses have to be captured to extract the pitch information. This is a problem especially for low male voices with pitch periods that may exceed the typical window lengths used in practical applications (M. Krini and G. Schmidt, "Spectral refinement and its application to fundamental frequency estimation," in Proc. of WASPAA, New Paltz, New York, USA, 2007). Increasing the window length is mostly not acceptable since it also increases the system latency as well as the computational complexity.

Beyond that, the constraints regarding system latency and computational costs are very challenging for some applications. For ICC systems, such as disclosed above with regard to FIG. 1A, the system latency has to be kept as low as possible in order to ensure a convenient listening experience. Since the original speech and the amplified signal overlay in cabin, delays longer than 10 ms between both signals are perceived as annoying by the listeners (G. Schmidt and T. Haulick, "Signal processing for in-car communication systems," Signal processing, vol. 86, no. 6, pp. 1307-1326, 2006). Thus, very short windows may be employed which obviates the application of standard approaches for pitch estimation.

An example embodiment disclosed herein introduces a pitch estimation method that is capable of dealing with very short windows. In contrast to usual approaches, pitch information, such as pitch frequency or pitch period, is not extracted based on a single long frame. Instead, an example embodiment considers a phase relation between multiple shorter frames. An example embodiment enables resolution of even very low pitch frequencies. Since an example embodiment may operate completely in a frequency domain, a low computational complexity may be achieved.

Figure 1B:
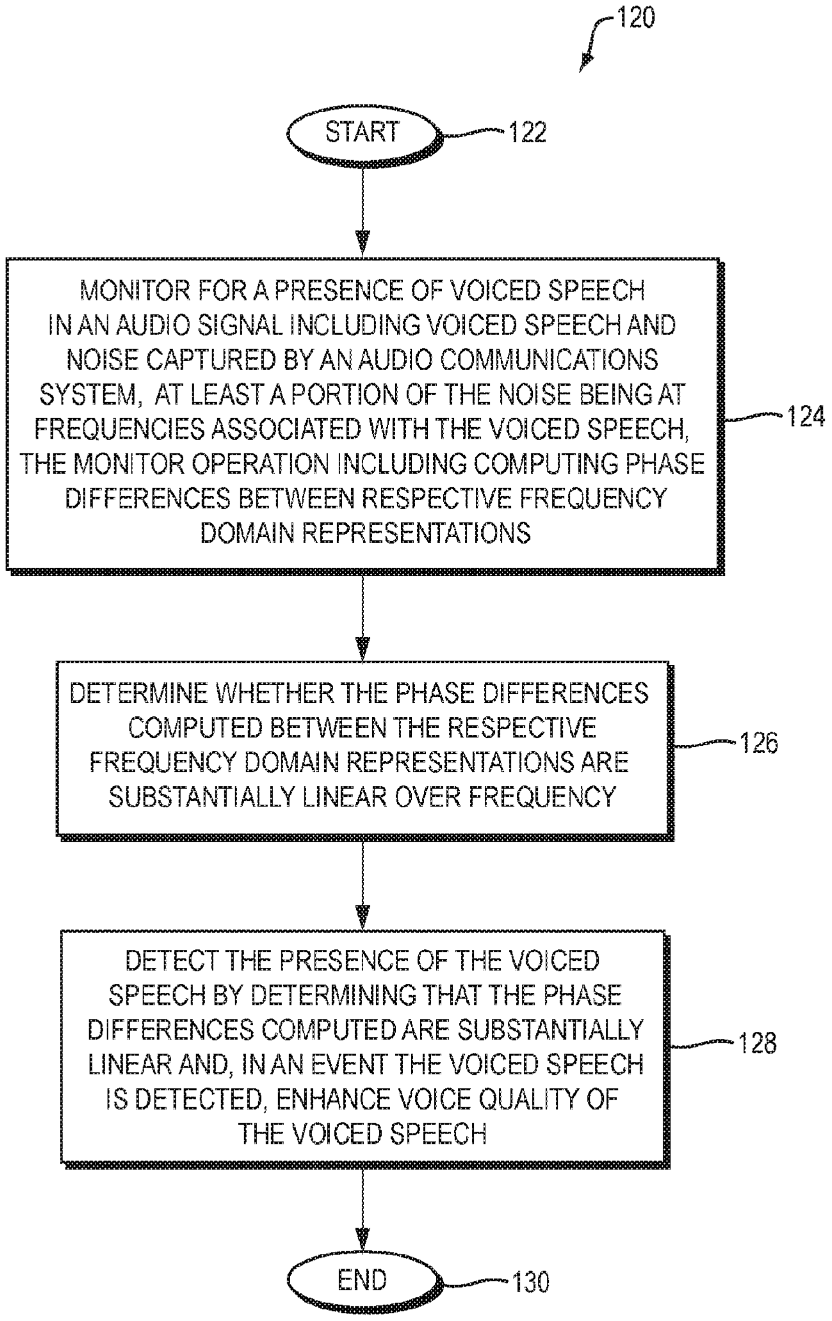
FIG. 1B is a flow diagram of an example embodiment of a method for voice quality enhancement in an audio communications system.

FIG. 1B is a flow diagram 120 of an example embodiment of a method for voice quality enhancement in an audio communications system. The method may start (122) and monitor for a presence of voiced speech in an audio signal including the voiced speech and noise captured by the audio communications system (124). At least a portion of the noise may be at frequencies associated with the voiced speech. The monitoring may include computing phase differences between respective frequency domain representations of present audio samples of the audio signal in a present short window and of previous audio samples of the audio signal in at least one previous short window. The method may determine whether the phase differences computed between the respective frequency domain representations are substantially linear over frequency (126). The method may detect the presence of the voiced speech by determining that the phase differences computed are substantially linear and, in an event the voiced speech is detected, enhance voice quality of the voiced speech communicated via the audio communications system by applying speech enhancement to the audio signal (128) and the method thereafter ends (130) in the example embodiment.

The method may further comprise estimating a pitch frequency of the voiced speech, directly in a frequency domain, based on the presence being detected and the phase differences computed.

Typical pitch estimation techniques search for periodic components in a long frame. Typical pitch estimation techniques may use, for example, an auto-correlation function (ACF), to detect repetitive structures in a long frame. A pitch period may then be estimated by finding a position of a maximum of the ACF.

In contrast, an example embodiment disclosed herein detects repetitive structures by comparing pairs of short frames (i.e., windows) that may be overlapping or non-overlapping in time. An assumption may be made that two excitation impulses are captured by two different short frames. Further assuming that both impulses are equally shaped, signal sections in both frames may be equal except for a temporal shift. By determining this shift, the pitch period may be estimated very efficiently.

Figure 5:
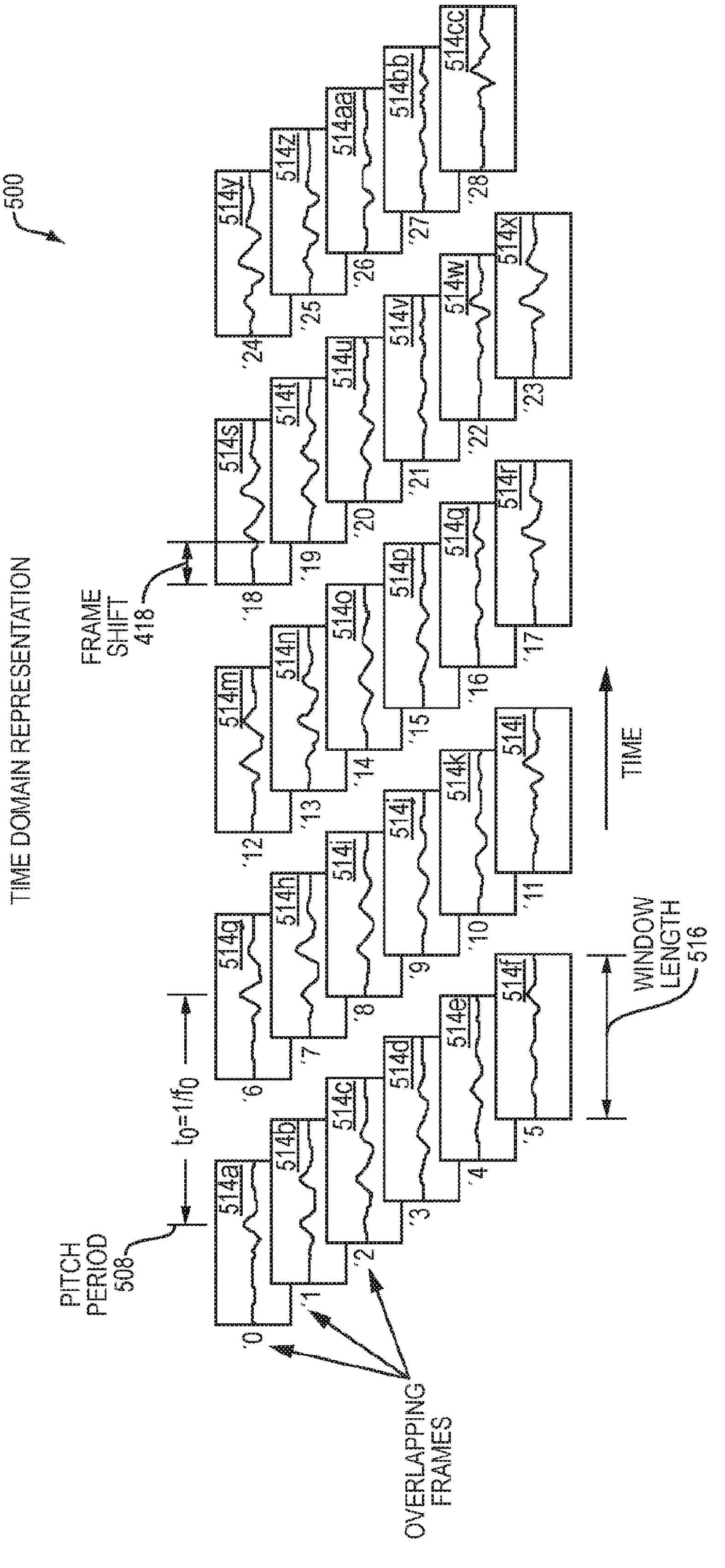
FIG. 5 is a time-domain representation of an example embodiment of multiple short windows.

FIG. 5 is a time-domain representation 500 of an example embodiment of multiple short windows of an audio signal (not shown). The multiple short windows include short windows 514*a-z* and 514*aa*, 514*bb*, and 514*cc*. Each of the multiple short windows has a window length 516 that is too short to capture audio samples of a full period of a periodic voiced excitation impulse signal of the voiced speech in the audio signal. The window length 516 may be typical for audio communications applications with a requirement for low-latency, such as the ICC system disclosed above with regard to FIG. 1A. The window length 516 may be set to reduce audio communication latency in the ICC system.

Consecutive short windows of the multiple short windows 514*a-z* and 514*aa*, 514*bb*, and 514*cc* have a frame shift 418. An example embodiment may employ a relation between multiple short frames to retrieve pitch information, such as the pitch period 308. An example embodiment may assume that two impulses of a periodic excitation are captured by two different short frames, with a temporal shift, such as the short window 514*a*, that is, window 0, and the short window 514*g*, that is, window 6. As shown in the time-domain representation 500, the short window 514*a* and the short window 514*g* are shifted in time. An example embodiment may employ frequency domain representations of such short windows for monitoring for a presence of voiced speech, as disclosed below. Such frequency domain representations of short windows may be available as such frequency domain representations may be employed by multiple applications in an audio communications system with a requirement for low latency audio communications.

Figure 6:
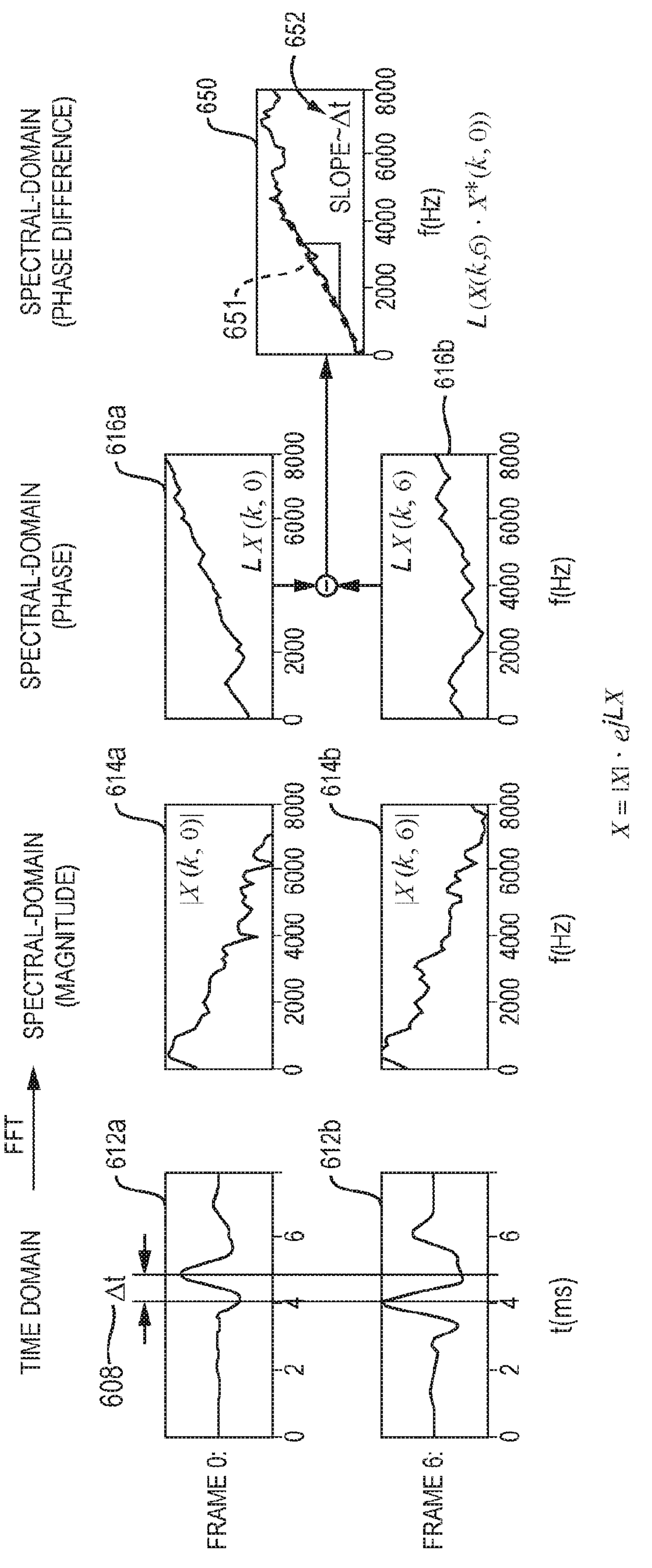
FIG. 6 is a time-domain to spectral domain transformation representation of an example embodiment of plots related thereto for two short windows of FIG. 5.

FIG. 6 is a time-domain to spectral domain transformation representation 600 of an example embodiment of plots related thereto for two short windows of FIG. 5. The time-domain to spectral domain transformation representation 600 includes a time-domain plots 612*a* and 612*b* for the short windows 514*a* and 514*g* or FIG. 5, respectively. As shown in FIG. 6, the time-domain representation of the short windows 514*a* and 514*g* are shifted temporally by a time difference 608. The time-domain representation of the short windows 514*a* and 514*g* may be transformed into a frequency domain via a Fast Fourier Transform (FFT) to producing magnitude and phase components in a spectral-domain. The spectral-domain magnitude plots 614*a* and 614*b* correspond to magnitude of the short windows 514*a* and 514*g*, respectively, in the spectral-domain. The spectral-domain phase plots 614*a* and 614*b* correspond to phase of the short windows 514*a* and 514*g*, respectively, in the spectral-domain. As shown in the spectral-domain phase difference plot 650, phase differences between respective frequency domain (i.e., spectral domain) representations of the short windows 514*a* and 514*g* are substantially linear over frequency and the time difference 608 may be computed from the slope 652. As such, the slope 652 of the phase differences that may be almost linear over frequency may be employed for pitch estimation. The phase differences computed may be considered to be substantially linear as the phase differences computed follow, approximately, a linear line 651 with deviations above and below the linear line.

As disclosed above, a method for voice quality enhancement in an audio communications system may comprise monitoring for a presence of voiced speech in an audio signal including the voiced speech and noise captured by the audio communications system. At least a portion of the noise may be at frequencies associated with the voiced speech. The monitoring may include computing phase differences between respective frequency domain representations of present audio samples of the audio signal in a present short window and of previous audio samples of the audio signal in at least one previous short window, such as the respective frequency domain representations 616*a* and 616*b*. The method may comprise determining whether the phase differences computed between the respective frequency domain representations 616*a* and 616*b* are substantially linear over frequency. The method may comprise detecting the presence of the voiced speech by determining that the phase differences computed are substantially linear, such as indicated by the substantially linear line 651, and, in an event the voiced speech is detected, enhancing voice quality of the voiced speech communicated via the audio communications system by applying speech enhancement to the audio signal.

Signal Model

Two hypotheses ($H_0$ and $H_1$) may be formulated for presence and absence of voiced speech. For presence of voiced speech, the signal x(n) may be expressed by a superposition:

$$H_0{:}x(n)=s_v(n,\tau_v(n))+b(n) \quad (1)$$

of voiced speech components $s_v$ and other components b comprising unvoiced speech and noise. Alternatively, when voiced speech is absent, the signal:

$$H_1{:}x(n)=b(n) \quad (2)$$

purely depends on noise or unvoiced speech components.

An example embodiment may detect a presence of voiced speech components. In an event that voiced speech is detected, an example embodiment may estimate a pitch frequency $f_v = f_s/\tau_v$ where $f_s$ denotes the sampling rate and $\tau_v$ the pitch period in samples.

Voiced speech may be modeled by a periodic excitation:

$$s_v(n,\tau_v)) = g_n + g_n(n+\tau_v(n)) + g_n(n+2\tau_v(n)) + \ldots \tag{3}$$

where a shape of a single excitation impulse is expressed by a function $g_n$. The distance $\tau_v$ between two succeeding peaks corresponds to the pitch period. For human speech, the pitch periods may assume values up to $\tau_{max} = f_s/50$ Hz for very low male voices.

Pitch Estimation Using Auto- and Cross-Correlation

Signal processing may be performed on frames of the signal:

$$x(\ell) = [x(\ell R - N + 1), \ldots, x(\ell R - 1), x(\ell R)]^T \tag{4}$$

where N denotes the window length and R denotes a frameshift.

For long windows $N > \tau_{max}$, and a maximum of the ACF:

$$acf_{xx}(\tau, \ell) = \frac{1}{N} \sum_{k=0}^{N-1} |X(k, \ell)|^2 \cdot e^{2\pi jk\tau/N} \tag{5}$$

may be in a range of human pitch periods that may be used to estimate the pitch as disclosed in FIGS. 7A-C, disclosed further below. An IDFT may be applied to transform the estimated high-resolution power spectrum $|X(k, \ell)|^2$ to the ACF.

Figure 7A:
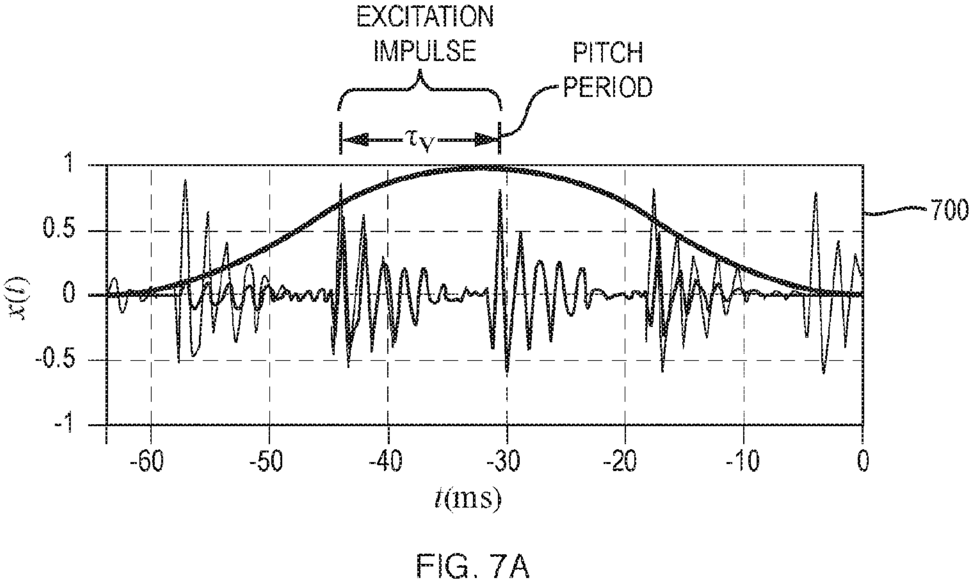
FIG. 7A is a plot of an example embodiment of a long window that captures multiple excitation impulses.

FIG. 7A is a plot 700 of an example embodiment of a long window that captures multiple excitation impulses.

Figure 7B:
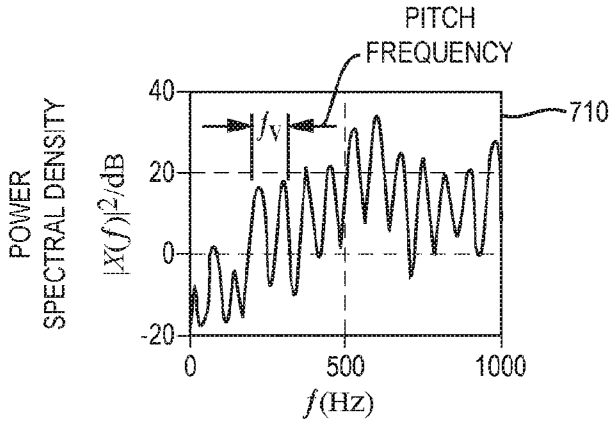
FIG. 7B is a plot of an example embodiment of power spectral density that reflects pitch frequency using only magnitude information.

FIG. 7B is a plot 710 of an example embodiment of power spectral density that reflects pitch frequency $f_v$ using only magnitude information.

Figure 7C:
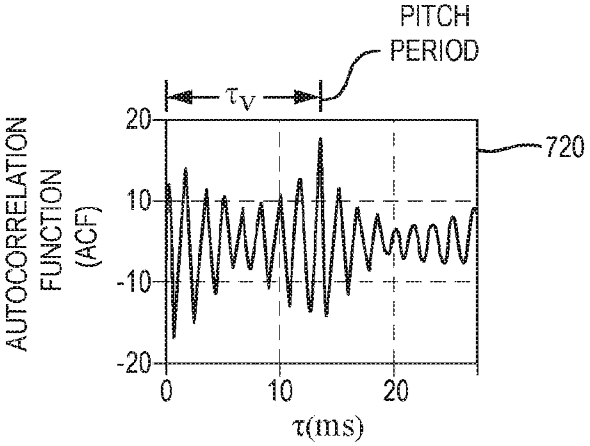
FIG. 7C is a plot showing a pitch period that may be determined by means of an autocorrelation function's (ACF) maximum.

FIG. 7C is a plot 720 showing a pitch period $\tau_v$ that may be determined by means of an autocorrelation function's (ACF) maximum.

In contrast to the above ACF based pitch estimation that employs a long window, an example embodiment disclosed herein may focus on very short windows $N \ll \tau$ that are too short to capture a full pitch period. The spectral resolution of $X(k, \ell)$ is low due to the short window length. However, for short frame shifts $R \ll \tau_{max}$, a good temporal resolution may achieved. In this case, an example embodiment may employ two short frames $x(\ell)$ and $x(\ell - \Delta\ell)$ to determine the pitch period as shown in FIG. 7D.

Figure 7D:
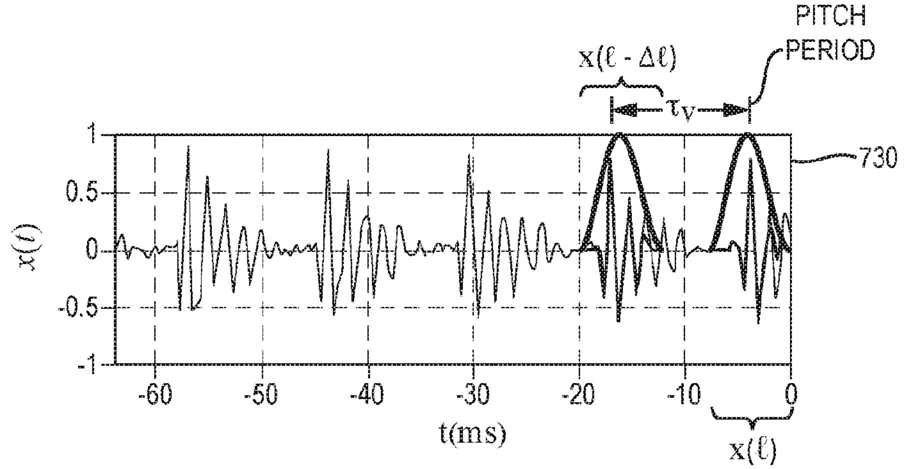
FIG. 7D is a plot of an example embodiment of two short windows.

FIG. 7D is a plot 730 of an example embodiment of two short windows. As shown in the plot 730, for shorter windows, two frames are needed to capture the pitch period.

When both frames contain different excitation impulses, the cross-correlation between the frames:

$$cc_{xx}(\tilde{\tau}, \ell, \Delta\ell) = \frac{1}{N} \sum_{k=0}^{N-1} X^*(k, \ell) \cdot X(k, \ell - \Delta\ell) \cdot e^{2\pi jk\tilde{\tau}/N} \tag{6}$$

has a maximum $\tilde{\tau}_v$ that corresponds to the pitch period $\tilde{\tau}_v = \tau_v + \Delta\ell \cdot R$. To emphasize the peak of the correlation, an example embodiment may employ the generalized cross-correlation (GCC):

$$gcc_{xx}(\tilde{\tau}, \ell, \Delta\ell) = \frac{1}{N} \sum_{k=0}^{N-1} \underbrace{\frac{X^*(k, \ell) \cdot X(k, \ell - \Delta\ell)}{|X^*(k, \ell) \cdot X(k, \ell - \Delta\ell)|}}_{GCS_{xx}(k,\ell,\Delta\ell)} \cdot e^{2\pi jk\tilde{\tau}/N} \tag{7}$$

instead. By removing the magnitude information in the normalized cross-spectrum $GCS_{xx}$, the GCC purely relies on the phase. As a consequence, a distance between the two impulses can be clearly identified as disclosed in FIG. 7E.

Figure 7E:
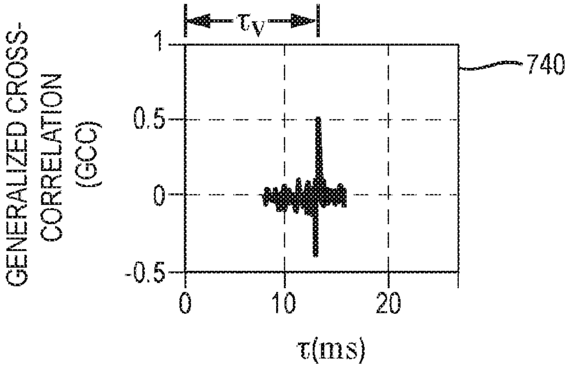
FIG. 7E is a plot of an example embodiment of a generalized cross-correlation (GCC) between the frames.

FIG. 7E is a plot 740 of an example embodiment of a GCC between the frames. The plot 740 shows that the GCC between the frames shows the peak more distinctly compared to the ACF in FIG. 7C.

Figure 7F:
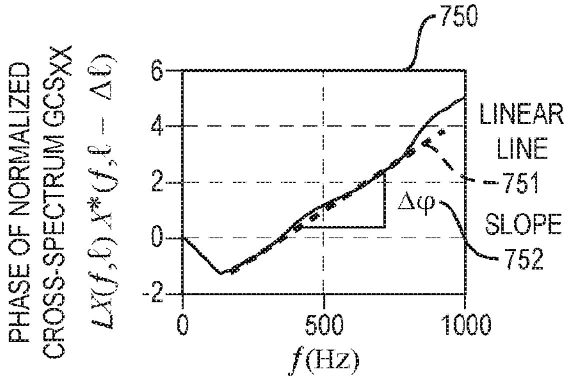
FIG. 7F is a plot of phase of an example embodiment of phase of a normalized cross spectrum ($GCS_{xx}$) of the GCC of FIG. 7E.

FIG. 7F is a plot 750 of an example embodiment of phase of a normalized cross spectrum ($GCS_{xx}$) of the GCC of FIG. 7E. The plot 750 shows that phase differences between two low-resolution spectra contain all relevant information for pitch estimation. An example embodiment of method may estimate the pitch period directly in the frequency domain. The estimation may be based on a slope 752 of the phase differences of the $GCS_{xx}$, as disclosed below. As shown in the plot 750, the phase differences may be considered to be substantially linear as the phase differences follow, approximately, a linear line 751 with deviations above and below the linear line.

Pitch Estimation Based on Phase Differences

When two short frames capture temporally shifted impulses of the same shape, the shift may be expressed by a delay. In a frequency domain, this may be characterized by a linear phase of the cross-spectrum. In this case, the phase relation between neighboring frequency bins:

$$\Delta GCS(k, \ell, \Delta\ell) = GCS_{xx}(k, \ell, \Delta\ell) \cdot GCS^*_{xx}(k-1, \ell, \Delta\ell) \tag{8}$$

$$= e^{j\Delta\varphi(k,\ell,\Delta\ell)} \tag{9}$$

is constant for all frequencies with a phase difference $\Delta\varphi(\ell, \Delta\ell) = \Delta\varphi(1, \ell, \Delta\ell) = \Delta\varphi(2, \ell, \Delta\ell) = \ldots$. For signals that don't exhibit a periodic structure, $\Delta\ell(k, \ell, \Delta\ell)$ has a rather random nature over k. Testing for linear phase, therefore, may be employed to detect voiced components.

An example embodiment may employ a weighted sum along frequency:

$$\overline{\Delta GCS}(\ell, \Delta\ell) = \frac{\sum_{k=1}^{K-1} w(k, \ell, \Delta\ell) \cdot \Delta GCS(k, \ell, \Delta\ell)}{\sum_{k=1}^{K-1} w(k, \ell, \Delta\ell)} \tag{10}$$

to detect speech and estimate the pitch frequency. For harmonic signals, a magnitude of the weighted sum yields values close to 1 due to the linear phase. Otherwise, smaller values result. In the example embodiment, the weighting coefficients, $w(k, \ell, \Delta\ell)$ may be used to emphasize frequencies that are relevant for speech. The weighting coefficients may be set to fixed values or chosen dynamically, for example, using an estimated signal-to-noise power ratio (SNR). An example embodiment may set them to:

$$w(k, \ell, \Delta\ell) = \begin{cases} |X(k, \ell)| & \text{for } 50\text{ Hz} < kf_s/N < 4\text{ kHz} \\ 0 & \text{else} \end{cases} \tag{11}$$

in order to emphasize dominant components in the spectrum in the frequency range of voiced speech. The weighted sum in (10) relies only on a phase difference between a most current frame $\ell$ and one previous frame $\ell-\Delta\ell$. To include more than two excitation impulses for the estimate, an example embodiment may apply temporal smoothing:

$$\overline{\Delta GCS}(\ell,\Delta\ell)=\alpha\cdot\overline{\Delta GCS}(\ell-\Delta\ell,\Delta\ell)+(1-\alpha)\cdot\overline{\Delta GCS}(\ell,\Delta\ell). \tag{12}$$

The temporal context that is employed may be adjusted according to an example embodiment by changing the smoothing constant α. For smoothing, an example embodiment may only consider frames that probably contain a previous impulse. An example embodiment may search for impulses with a distance of $\Delta\ell$ frames and may take a smoothed estimate at $\ell-\Delta\ell$ into account.

Based on averaged phase differences, an example embodiment may define a voicing feature:

$$p_v(\ell,\Delta\ell)=\left|\overline{\Delta GCS}(\ell,\Delta\ell)\right| \tag{13}$$

that represents a linearity of the phase. When all complex values ΔGCS have a same phase, they accumulate and result in a mean value of magnitude one indicating linear phase. Otherwise, the phase may be randomly distributed and the result assumes lower values.

In a similar way, an example embodiment may estimate the pitch period. Replacing the magnitude in (13) by an angle operator:

$$\widehat{\Delta\varphi}(\ell,\Delta\ell)=\angle\overline{\Delta GCS}(\ell,\Delta\ell) \tag{14}$$

an example embodiment may estimate of the slope of the linear phase. According to an example embodiment, this slope may be converted to an estimate of the pitch period:

$$\hat{\tau}_v(\ell,\Delta\ell)=\frac{\widehat{\Delta\varphi}(\ell,\Delta\ell)}{2\pi}N+\Delta\ell\cdot R. \tag{15}$$

In contrast to conventional approaches, an example embodiment may estimate the pitch directly in the frequency domain based on the phase differences. The example embodiment may be implemented very efficiently since there is no need for either a transformation back into a time domain or a maximum search in the time domain as is typical of ACF-based methods.

As such, turning back to FIG. 1B, the method may further comprise estimating a pitch frequency of the voiced speech, directly in a frequency domain, based on the presence being detected and the phase differences computed. The computing of the phase differences may include computing a weighted sum over frequency of phase relations between neighboring frequencies of a normalized cross-spectrum of the respective frequency domain representations and computing a mean value of the weighted sum computed, such as disclosed with regard to Eq. (10), above. The determining for whether the phase differences computed between the respective frequency domain representations are substantially linear over frequency may include comparing a magnitude of the mean value computed, as disclosed above with regard to Eq. (13), to a threshold value representing linearity to determine whether the phase differences computed are substantially linear. When all complex values ΔGCS have a same phase, they accumulate and result in a mean value of magnitude one indicating linear phase. According to an example embodiment, the threshold may be a value less than one. Since the maximum value of one is only achieved for perfect linearity, the threshold may be set to a value of less than one. A threshold value of, e.g., 0.5 may be employed to detect voiced speech where the phase is almost (but not perfectly) linear and to separate it from noise where the magnitude of the mean value is much lower.

The mean value may be a complex number and, in the event the phase differences computed are determined to be substantially linear, the method may further comprise estimating a pitch period of the voiced speech, directly in a frequency domain, based on an angle of the complex number, such as disclosed with regard to Eq. (14), above.

The method may include comparing the mean value computed to other mean values each computed based on the present short window and a different previous short window and estimating a pitch frequency of the voiced speech, directly in a frequency domain, based on an angle of a highest mean value, the highest mean value selected from amongst the mean value and other mean values based on the comparing, such as disclosed with regard to Eq. (16), further below.

Computing the weighted sum may include employing weighting coefficients at frequencies in a frequency range of voiced speech, such as disclosed with regard to Eq. (11), above, and applying a smoothing constant in an event the at least one previous frame includes multiple frames, such as disclosed with regard to Eq. (12), above.

The method may further comprise estimating a pitch frequency of the voiced speech, directly in a frequency domain, based on the presence being detected. The computing may include computing a normalized cross-spectrum of the respective frequency domain representations, such as disclosed with regard to Eq. (7), above. The estimating may include computing a slope of the normalized cross-spectrum computed, such as disclosed with regard to Eq. (14), above, and converting the slope computed to the pitch period, such as disclosed with regard to Eq. (15), above.

The method may further comprise estimating a pitch frequency of the voiced speech, directly in a frequency domain, based on the presence being detected and the phase differences computed and applying an attenuation factor to the audio signal based on the presence not being detected, such as disclosed with regard to FIG. 15, further below. In the loss control application of FIG. 15, speech detection results may be employed not only to apply such an attenuation factor when no speech is detected but to also activate only one direction in order to prevent from echoes. A decision as to which direction is activated (and deactivated) may depend on sophisticated rules that include the speech detection results. In addition, the speech enhancement may include reconstructing the voiced speech based on the pitch frequency estimated, disabling noise tracking, such as disclosed with regard to FIG. 13, further below, applying an adaptive gain to the audio signal, such as disclosed with regard to FIG. 14, further below, or a combination thereof

Post-Processing and Detection

An example embodiment may employ post-processing and the post-processing may include combining results of different short frames to achieve a final voicing feature and a pitch estimate. Since a moving section of an audio signal may be captured by the different short frames, a most current frame may contain one excitation impulse; however, it might also lie between two impulses. In this case, no voiced speech would be detected in the current frame even though a distinct harmonic excitation is present in the signal. To prevent from these gaps, maximum values of $p_v(\ell, \Delta\ell)$ may be held over $\Delta\ell$ frames in an example embodiment.

Using Eq. (13), disclosed above, multiple results for different pitch regions may be considered in an example embodiment. In the example embodiment, for each phase difference between the current frame $\ell$ and one previous frame $\ell-\Delta\ell$, a value of the voicing feature $p_v(\ell, \Delta\ell)$ may be determined. The different values may be fused to a final feature by searching for the most probable region:

$$\widehat{\Delta\ell}(\ell) = \underset{\Delta\ell}{\operatorname{argmax}}(p_v(\ell, \Delta\ell)) \tag{16}$$

that contains the pitch period. Then, the voicing feature and pitch estimate may be given by $p_v(\ell)=p_v(\ell, \widehat{\Delta\ell}(\ell))$ and $\hat{f}_v(\ell)=\hat{f}_v(\ell, \widehat{\Delta\ell}(\ell))$, respectively. It should be understood that alternative approaches may also be employed to find the most probable region. The maximum is a good indicator; however, improvements could be made by checking other regions as well. For example, when two values are similar and close to the maximum, it is better to choose the lower distance $\Delta\ell$ in order to prevent from detection of sub-harmonics.

Based on the voicing feature $p_v$, an example embodiment may make a determination regarding a presence of voiced speech. To decide for one of the two hypotheses $H_0$ and $H_1$ in (1) and (2), disclosed above, a threshold $\eta$ may be applied to the voicing feature. In an event the voicing feature exceeds the threshold, the determination may be that voiced speech is detected, otherwise absence of voiced speech may be supposed.

Experiments and Results

Experiments and results disclosed herein focus on an automotive noise scenario that is typical for ICC applications. Speech signals from the Keele speech database (F. Plante, G. F. Meyer, and W. A. Ainsworth, "A pitch extraction reference database," in Proc. of EUROSPEECH, Madrid, Spain, 1995) and automotive noise from the UTD-CAR-NOISE database (N. Krishnamurthy and J. H. L. Hansen, "Car noise verification and applications," International Journal of Speech Technology, December 2013) are employed. The signals are downsampled to a sampling rate of $f_s$=16 kHz. A frameshift of R=32 samples (2 ms) is used for all analyses disclosed herein. For the short frames, a Hann window of 128 samples (8 ms) is employed.

A pitch reference based on laryngograph recordings is provided with the Keele database. This reference is employed as a ground truth for all analyses.

For comparison, a conventional pitch estimation approach based on ACF is employed and such an ACF-based approach may be referred to interchangeably herein as a baseline method or baseline approach. This baseline method is applied to the noisy data to get a baseline to assess the performance of an example embodiment also referred to interchangeably herein as a low-complexity feature, low-complexity method, low-complexity approach, low-complex feature, low-complex method, low-complex approach, or simply "low-complexity" or "low-complex." Since a long temporal context is considered by the long window of 1024 samples (64 ms), a good performance can be achieved using the baseline approach.

Figure 8A:
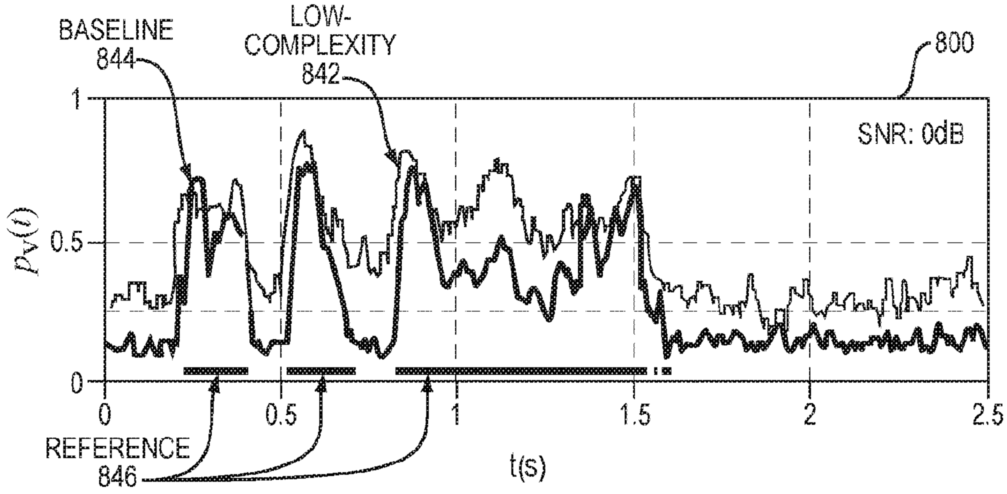
FIG. 8A is a plot of detection results.
Figure 8B:
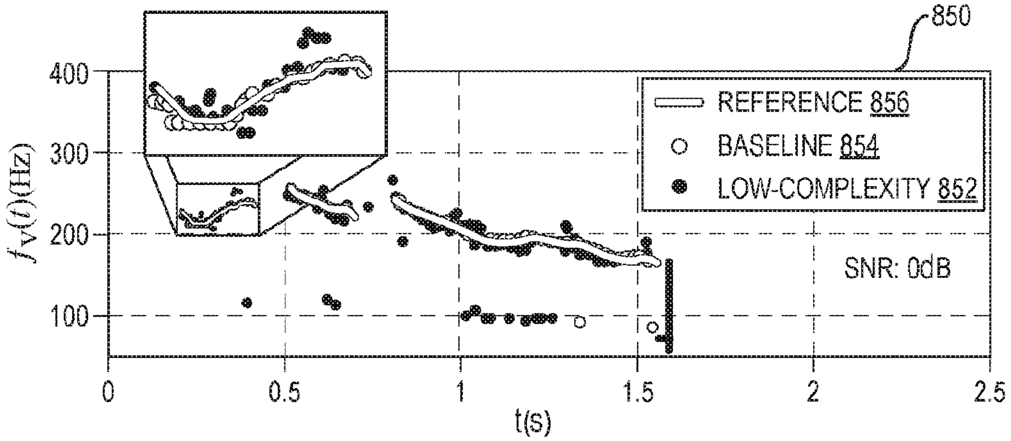
FIG. 8B is a plot of pitch estimation results.

In one example, speech and noise were mixed to an SNR of 0 dB. FIG. 8A and FIG. 8B disclose a detection result and pitch estimate, respectively, for both the low-complexity method, the baseline method, as well as a reference.

FIG. 8A is a plot 800 of detection results $p_v(t)$ for a baseline method 844 and an example embodiment of a low-complexity method 842 for a noisy speech signal (SNR=0 dB). In addition, a reference 846 (i.e., ground truth) for the noisy speech signal (SNR=0 dB) is plotted to show regions for which voiced speech should be detected.

FIG. 8B is a plot 850 of pitch estimation results for an example embodiment of a pitch estimate $f_v$, that is, the low-complexity pitch estimate results 852 and pitch estimate results of a baseline method 854 with respect to a reference 856 (i.e., ground truth) for the noisy speech signal (SNR=0 dB) employed to obtain the detection results of FIG. 8A, disclosed above.

As shown in FIG. 8A, the low-complexity feature indicates speech similar to the ACF-based baseline method. As shown in FIG. 8B, both approaches are capable to estimate the pitch frequency; however, a variance of the low-complexity feature is higher. Some sub-harmonics are observable for both approaches and even for the reference. Both the low-complexity and baseline methods indicate voiced speech by high values of the voicing feature $p_v$ close to one. According to an example embodiment, a threshold may be applied as a simple detector. The threshold was set to $\eta$=0.25 for the conventional approach and to $\eta$=0.5 for the low-complexity approach and the pitch was estimated only when the voicing feature exceeded the threshold. The resulting pitch estimates for the low-complexity method demonstrate that it is capable to track the pitch. However, the results are not as precise as the results from the baseline method.

To evaluate the performance for a more extensive database, the ten utterances (duration 337 s) from the Keele database spoken by male and female speakers were mixed with automotive noise and the SNR was adjusted. A receiver operating characteristic (ROC) was determined for each SNR value by tuning the threshold $\eta$ between 0 and 1. A rate of correct detections was found by comparing the detections for a certain threshold to the reference of voiced speech. On the other hand, a false-alarm rate was calculated for intervals where the reference indicated absence of speech. By calculating an area under ROC curve (AUC), a performance curve was compressed to a scalar measure. AUC values close to one indicate a good detection performance whereas values close to 0.5 correspond to random results.

Figure 9:
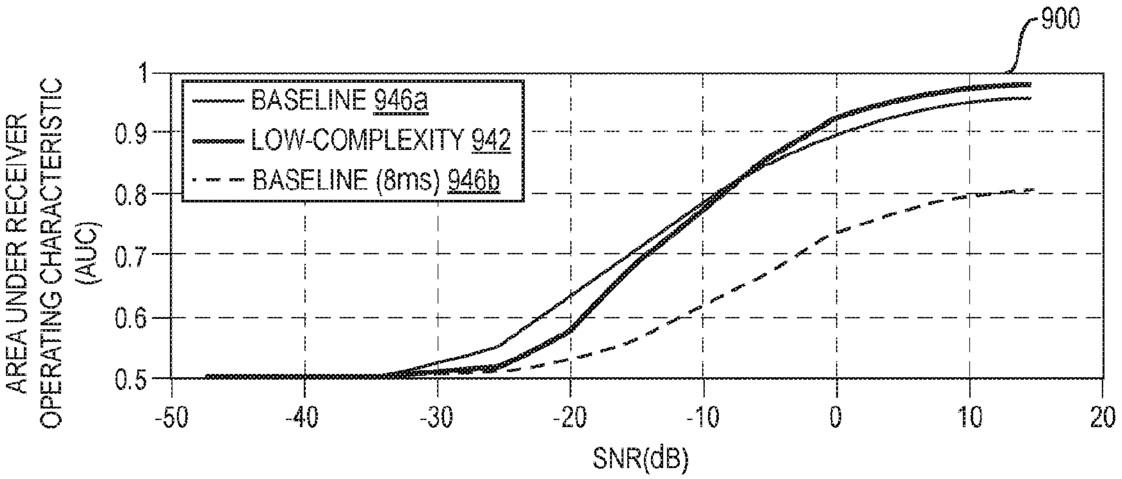
FIG. 9 is a plot of performance results for an example embodiment and baseline methods over signal-to-noise ratio (SNR).

FIG. 9 is a plot 900 of performance results for an example embodiment and baseline methods over SNR. The plot 900 shows that the low-complexity feature 942 shows a good detection performance that is similar to the performance of the baseline method 946*a* with a long context. When applying the baseline method 946*b* to a shorter window, even for high SNRs the performance is low since low pitch frequencies cannot be resolved. As disclosed, the baseline approach 946*a* shows a good detection performance since it captures a long temporal context. Even though the low-complexity approach 942 has to deal with less temporal context, a similar detection performance is achieved. When applying the baseline approach 946*b* to a short window, even for high SNRs voiced speech is not perfectly detected. Low pitch frequencies cannot be resolved using a single short window which explains the low performance.

In a second analysis, focus is on a pitch estimation performance for the low-complexity and baseline methods. For this, time instances were considered for which both a reference and method under test indicate presence of voiced speech. A deviation between an estimated pitch frequency and a reference pitch frequency is assessed. For 0 dB, a good detection performance for both methods is observed. Therefore, the pitch estimation performance for this situation is investigated.

Figure 10:
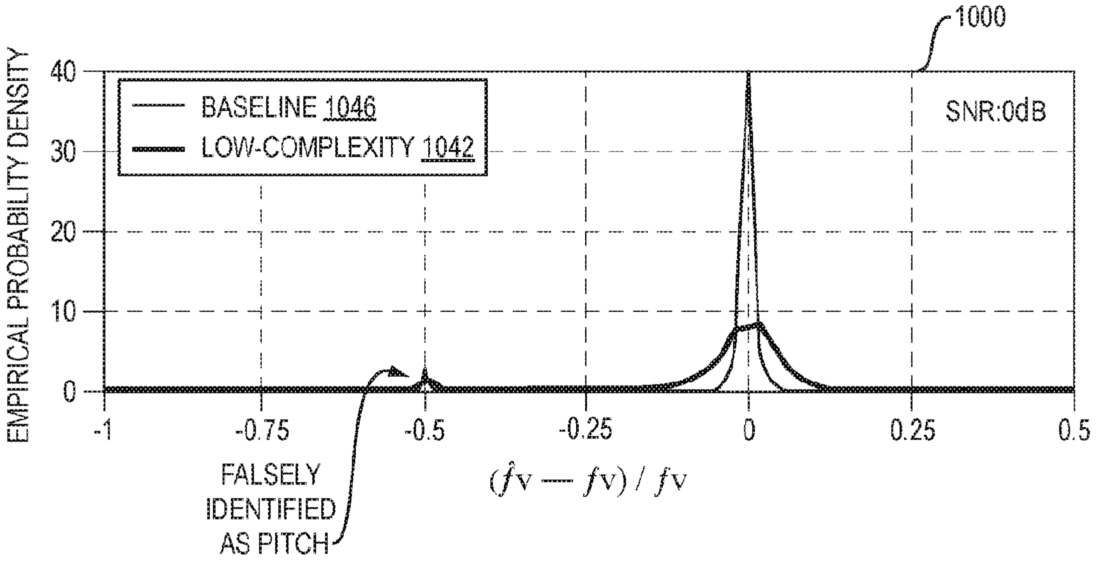
FIG. 10 is a plot showing distribution of errors of pitch frequency estimates.

FIG. 10 is a plot 1000 showing distribution of errors of pitch frequency estimates. In FIG. 10, a histogram of the deviations $\hat{f}_v - f_v$ relative to a reference frequency $f_v$ is depicted. It is observable that the pitch frequency is mostly estimated correctly. However, small deviations in an interval of ±10% of the reference pitch frequency can be noticed for both methods, that is, the low-complexity method 1042 and the baseline method 1046. The smaller peak at −0.5 can be explained by sub-harmonics that were accidentally selected and falsely identified as the pitch. By applying a more advanced post-processing instead of the simple maximum search, as disclosed above with reference to Eq. (16), this type of errors could be reduced.

Deviations from the reference pitch frequency can be evaluated using the gross pitch error (GPE) (W. Chu and A. Alwan, "Reducing f0 frame error of f0 tracking algorithms under noisy conditions with an unvoiced/voiced classification frontend," in Proc. of ICASSP, Taipei, Taiwan, 2009). For this, an empirical probability is determined of deviations that are greater than 20% of the reference pitch: $P(|\hat{f}_v - f_v| > 0.2 \cdot f_v)$.

Figure 11:
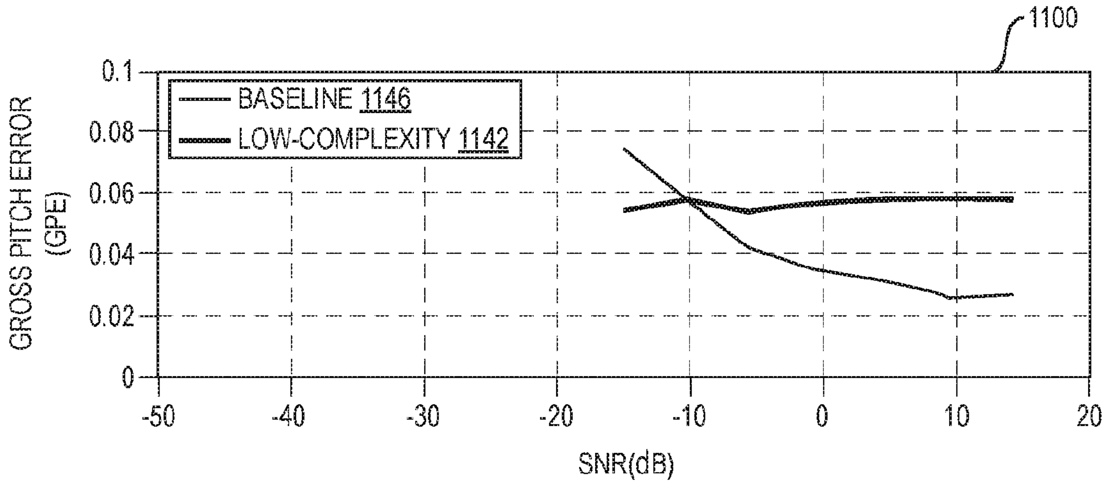
FIG. 11 is a plot of gross pitch error (GPE).

FIG. 11 is a plot 1100 of gross pitch error (GPE). The plot 1100 shows an empirical probability of pitch estimation errors with deviations that exceed 20% of the reference pitch frequency. The baseline approach 1146 estimates the pitch frequency more accurately than the example embodiment of the low-complexity method 1142. In FIG. 11, the GPE is depicted for SNRs where a reasonable detection performance was achieved. For high SNRs, higher deviations of the low-complexity approach may be observed as compared to the conventional baseline approach. Many of these errors can be explained with sub-harmonics that are falsely identified as the pitch frequency.

CONCLUSIONS

A low-complexity method for detection of voiced speech and pitch estimation is disclosed that is capable of dealing with special constraints given by applications where low latency is required, such as ICC systems. In contrast to conventional pitch estimation approaches, an example embodiment employs very short frames that capture only a single excitation impulse. A distance between multiple impulses, corresponding to the pitch period, is determined by evaluating phase differences between the low-resolution spectra. Since no IDFT is needed to estimate the pitch, the computational complexity is low compared to standard pitch estimation techniques that may be ACF-based.

Figure 12:
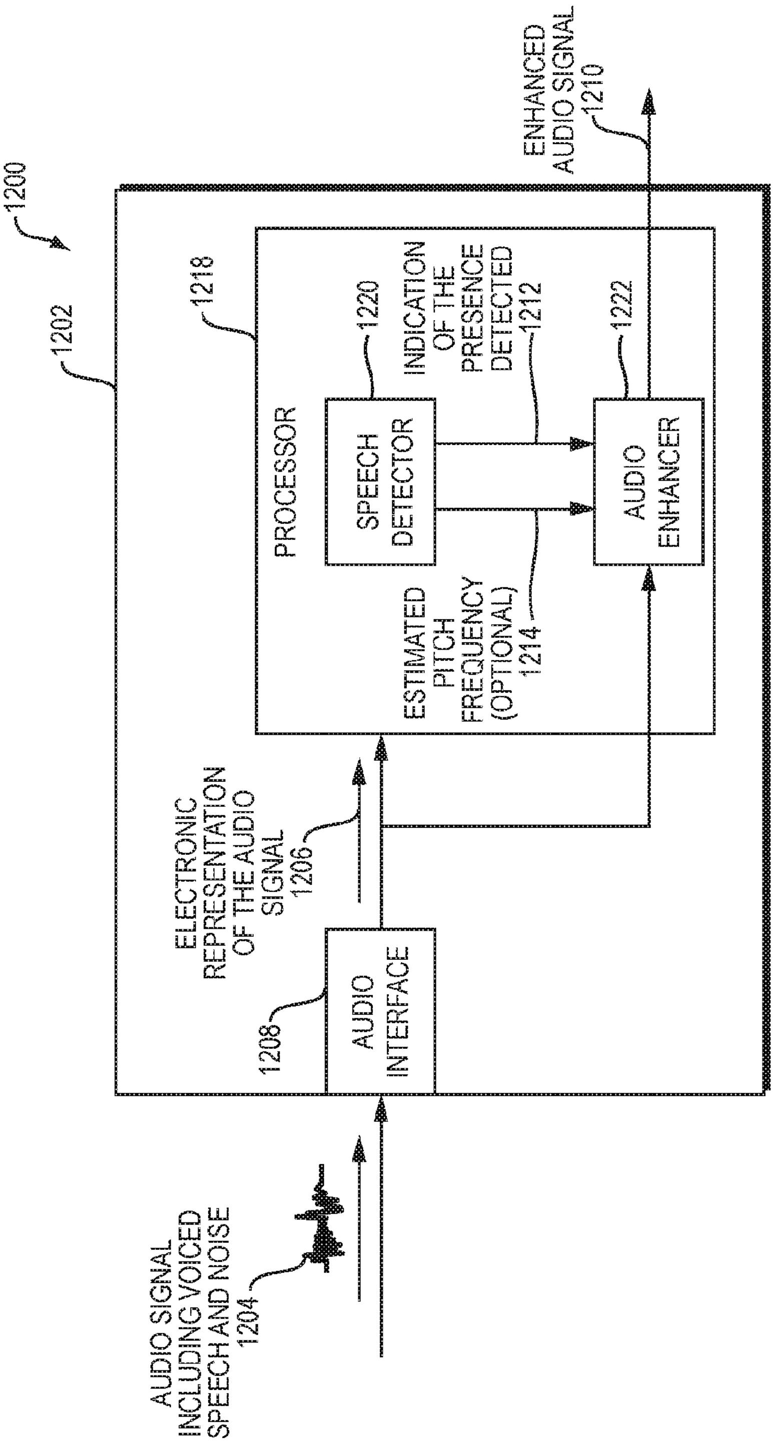
FIG. 12 is a block diagram of an example embodiment of an apparatus for voice quality enhancement in an audio communications system.

FIG. 12 is a block diagram 1200 of an apparatus 1202 for voice quality enhancement in an audio communications system (not shown) that comprises an audio interface 1208 configured to produce an electronic representation 1206 of an audio signal 1204 including voiced speech and noise captured by the audio communications system. At least a portion of the noise (not shown) may be at frequencies associated with the voiced speech (not shown). The apparatus 1202 may comprise a processor 1218 coupled to the audio interface 1208. The processor 1218 may be configured to implement a speech detector 1220 and an audio enhancer 1222. The speech detector 1220 may be coupled to the audio enhancer 1222 and configured to monitor for a presence of the voiced speech in the audio signal 1204. The monitor operation may include computing phase differences between respective frequency domain representations of present audio samples of the audio signal 1204 in a present short window and of previous audio samples of the audio signal 1204 in at least one previous short window. The speech detector 1220 may be configured to determine whether the phase differences computed between the respective frequency domain representations are substantially linear over frequency. The speech detector 1220 may be configured to detect the presence of the voiced speech by determining that the phase differences computed are substantially linear over frequency. The speech detector 1220 may be configured to communicate an indication 1212 of the presence detected to the audio enhancer 1222. The audio enhancer 1222 may be configured to enhance voice quality of the voiced speech communicated via the audio communications system by applying speech enhancement to the audio signal 1204 to produce an enhanced audio signal 1210. The speech enhancement may be based on the indication 1212 communicated.

The present and at least one previous short window may have a window length that is too short to capture audio samples of a full period of a periodic voiced excitation impulse signal of the voiced speech in the audio signal, the audio communications system may be an in-car-communications (ICC) system, and the window length may be set to reduce audio communication latency in the ICC system.

The speech detector 1220 may be further configured to estimate a pitch frequency of the voiced speech, directly in a frequency domain, based on the presence being detected and the phase differences computed. The speech detector 1220 may be configured to report speech detection results, such as the indication 1212 of the presence of the voiced speech and the pitch frequency 1214 related thereto to the audio enhancer 1222.

The compute operation may include computing a weighted sum over frequency of phase relations between neighboring frequencies of a normalized cross-spectrum of the respective frequency domain representations and computing a mean value of the weighted sum computed. The determining operation may include comparing a magnitude of the mean value computed to a threshold value representing linearity to determine whether the phase differences computed are substantially linear.

The mean value may be a complex number and, in the event the phase differences computed are determined to be substantially linear, the speech detector 1220 may be further configured to estimate a pitch period of the voiced speech, directly in a frequency domain, based on an angle of the complex number.

The speech detector 1220 may be further configured to compare the mean value computed to other mean values each computed based on the present short window and a different previous short window and estimate a pitch frequency of the voiced speech, directly in a frequency domain, based on an angle of a highest mean value, the highest mean value selected from amongst the mean value and other mean values based on the compare operation.

To compute the weighted sum, the speech detector 1220 may be further configured to employ weighting coefficients at frequencies in a frequency range of voiced speech and apply a smoothing constant in an event the at least one previous frame includes multiple frames.

The speech detector 1220 may be further configured to estimate a pitch frequency of the voiced speech, directly in a frequency domain, based on the presence being detected. The compute operation may include computing a normalized cross-spectrum of the respective frequency domain representations. The estimation operation may include computing a slope of the normalized cross-spectrum computed and converting the slope computed to the pitch period.

The speech detector 1220 may be further configured to estimate a pitch frequency of the voiced speech, directly in a frequency domain, based on the presence being detected and the phase differences computed and to communicate the pitch frequency estimated to the audio enhancer 1222. The audio enhancer 1222 may be further configured to apply an attenuation factor to the audio signal 1204 based on the indication 1212 communicated indicating the presence not being detected. The speech enhancement may include reconstructing the voiced speech based on the pitch frequency estimated and communicated 1214, disabling noise tracking, applying an adaptive gain to the audio signal, or a combination thereof.

As disclosed above, an example embodiment disclosed herein may be employed by an audio communications system, such as the ICC system of FIG. 1A, disclosed above. However, it should be understood that an example embodiment disclosed herein may be employed by any suitable audio communications system or application.

FIGS. 13-16, disclosed below, illustrate applications in which example embodiments, disclosed above, may be applied. Therefore, a complete set of reference indicators are not being provided in FIGS. 13-16.

Figure 13:
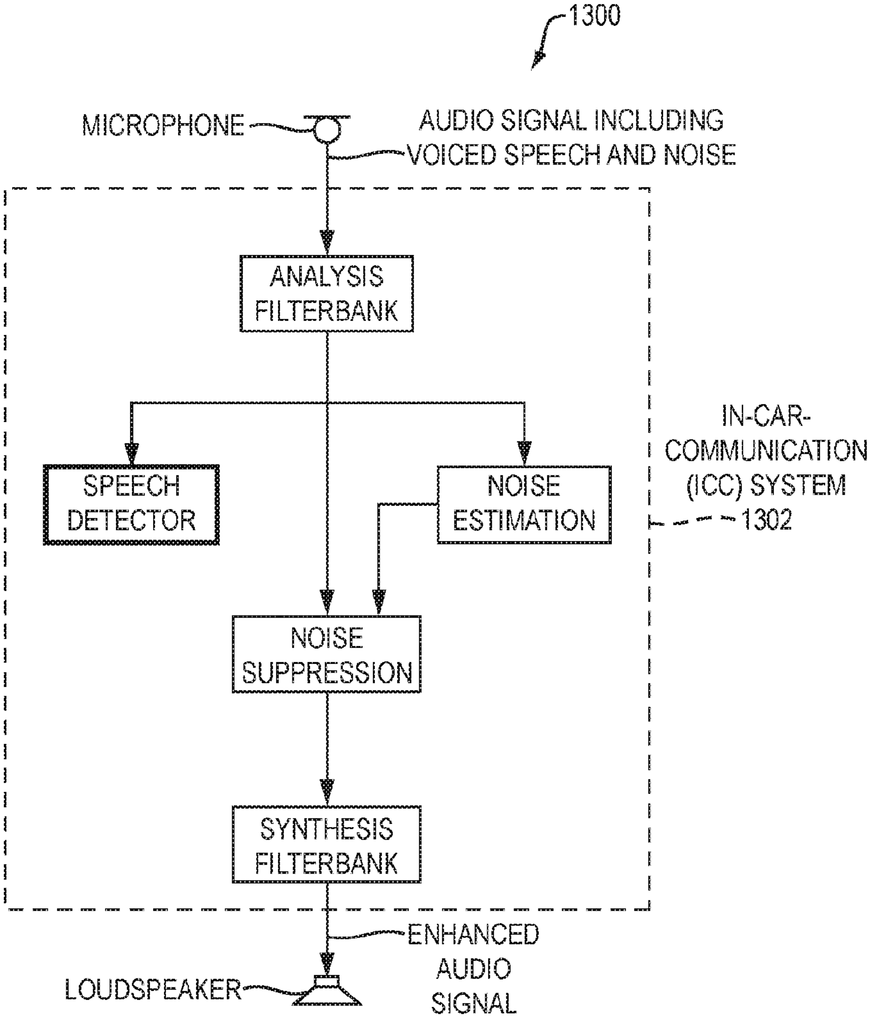
FIG. 13 is a block diagram of an example embodiment of an ICC system configured to perform speech enhancement by suppressing noise.

FIG. 13 is a block diagram 1300 of an example embodiment of an ICC system 1302 configured to perform speech enhancement by suppressing noise. An example embodiment of the speech detector 1220 of FIG. 12, disclosed above, may be employed by the ICC system 1302 for noise suppression. In the ICC system 1302, properties of background noise may be estimated and employed to suppress noise. The speech detector 1220 may be employed to control noise estimation in the ICC system 1302 such that the noise is only estimated when speech is absent and the pure noise is accessible.

Figure 14:
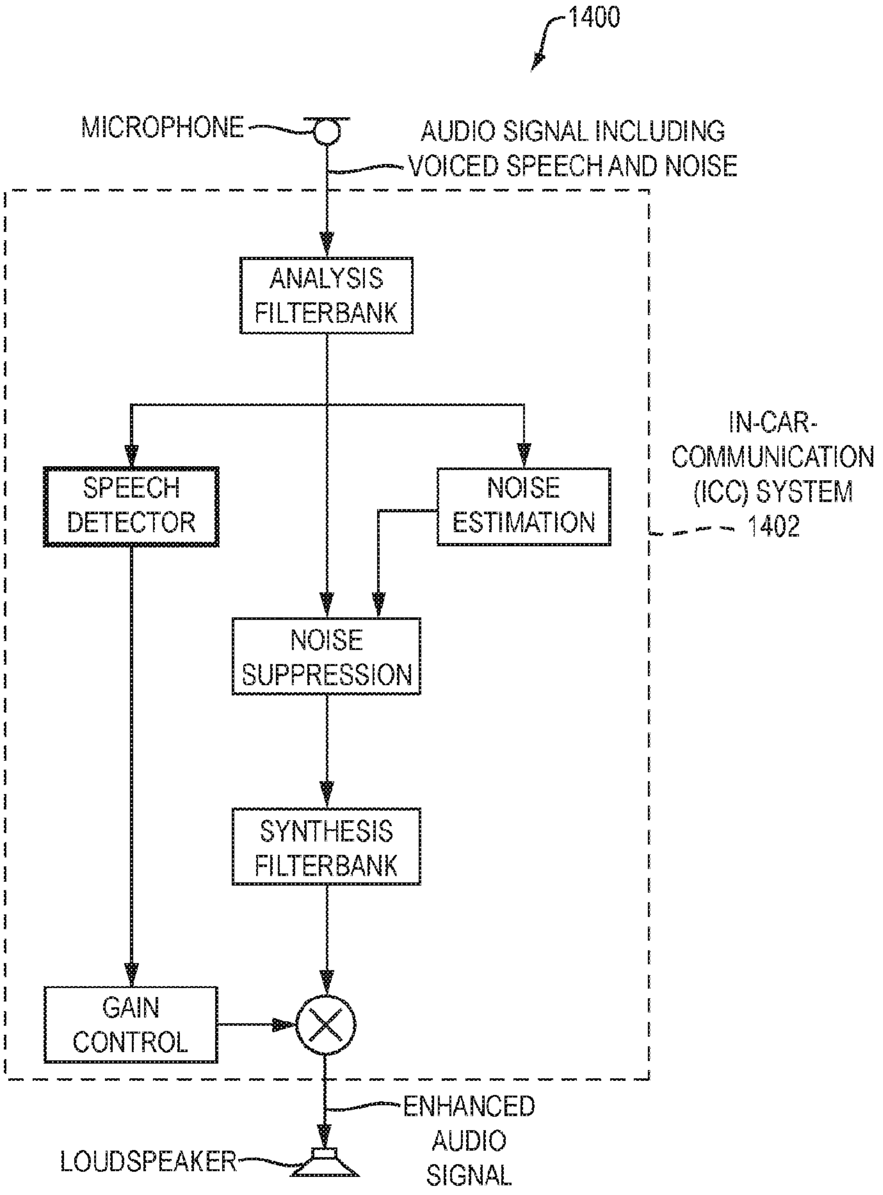
FIG. 14 is a block diagram of an example embodiment of an ICC system configured to perform speech enhancement via gain control.

FIG. 14 is a block diagram 1400 of an example embodiment of an ICC system 1402 configured to perform speech enhancement via gain control. An example embodiment of the speech detector 1220 of FIG. 12, disclosed above, may be employed by the ICC system 1402 for gain control. In the ICC system 1402, variations of the speech level may be compensated by applying an adaptive gain to the audio signal. Estimation of the speech level may be focused on intervals in which the speech is present by employing the speech detector 1220 of FIG. 12, disclosed above.

Figure 15:
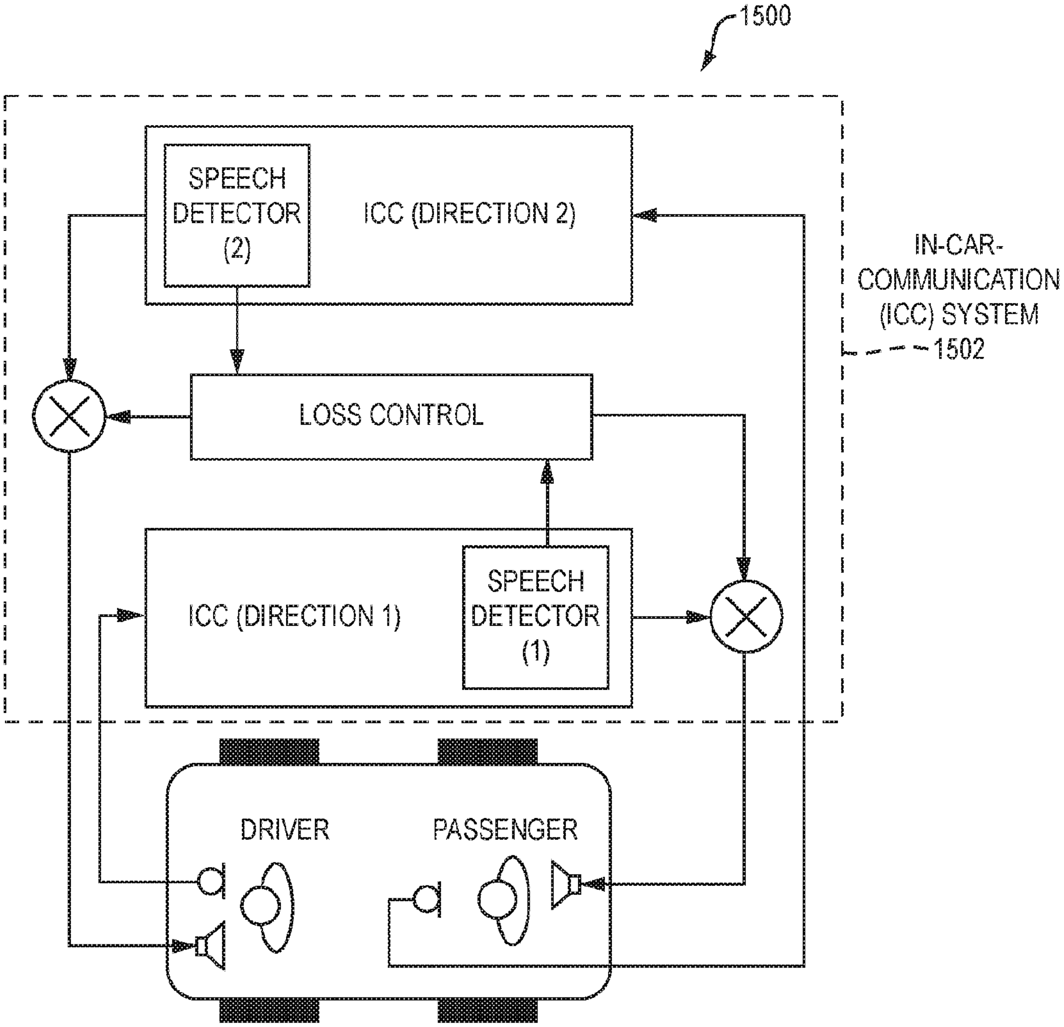
FIG. 15 is a block diagram of an example embodiment of an ICC system configured to perform loss control.

FIG. 15 is a block diagram 1500 of an example embodiment of an ICC system 1502 configured to perform loss control. In the loss control application of FIG. 15, speech detection results to activate only one direction in order to prevent from echoes. A decision as to which direction is activated (and deactivated) may depend on sophisticated rules that include the speech detection results. As such, loss control may be employed to control which direction of speech enhancement is activated. An example embodiment of the speech detector 1220 of FIG. 12, disclosed above, may be employed by the ICC system 1502 for loss control. In the example embodiment of FIG. 15, only one direction (front-to-rear or rear-to-front) is activated. A decision for which direction to activate may be made based on which speaker, that is, driver or passenger, is speaking and such a decision may be based on a presence of voiced speech detected by the speech detector 1220, as disclosed above.

As such, in the example embodiment of FIG. 15, a direction may be deactivated, that is, loss applied, in an event speech is not detected and the direction may be activated, that is, no loss applied, in an event speech is detected to be present. Loss control may be used to activate only the ICC direction of the active speaker in a bidirectional system. For example, the driver may be speaking to the rear-seat passenger. In this case, only the speech signal of the driver's microphone may be processed, enhanced, and played back via the rear-seat loudspeakers. Loss control may be used to block the processing of the rear-seat microphone signal in order to avoid feedback from the rear-seat loudspeakers from being transmitted back to the loudspeakers at the driver position.

Figure 16:
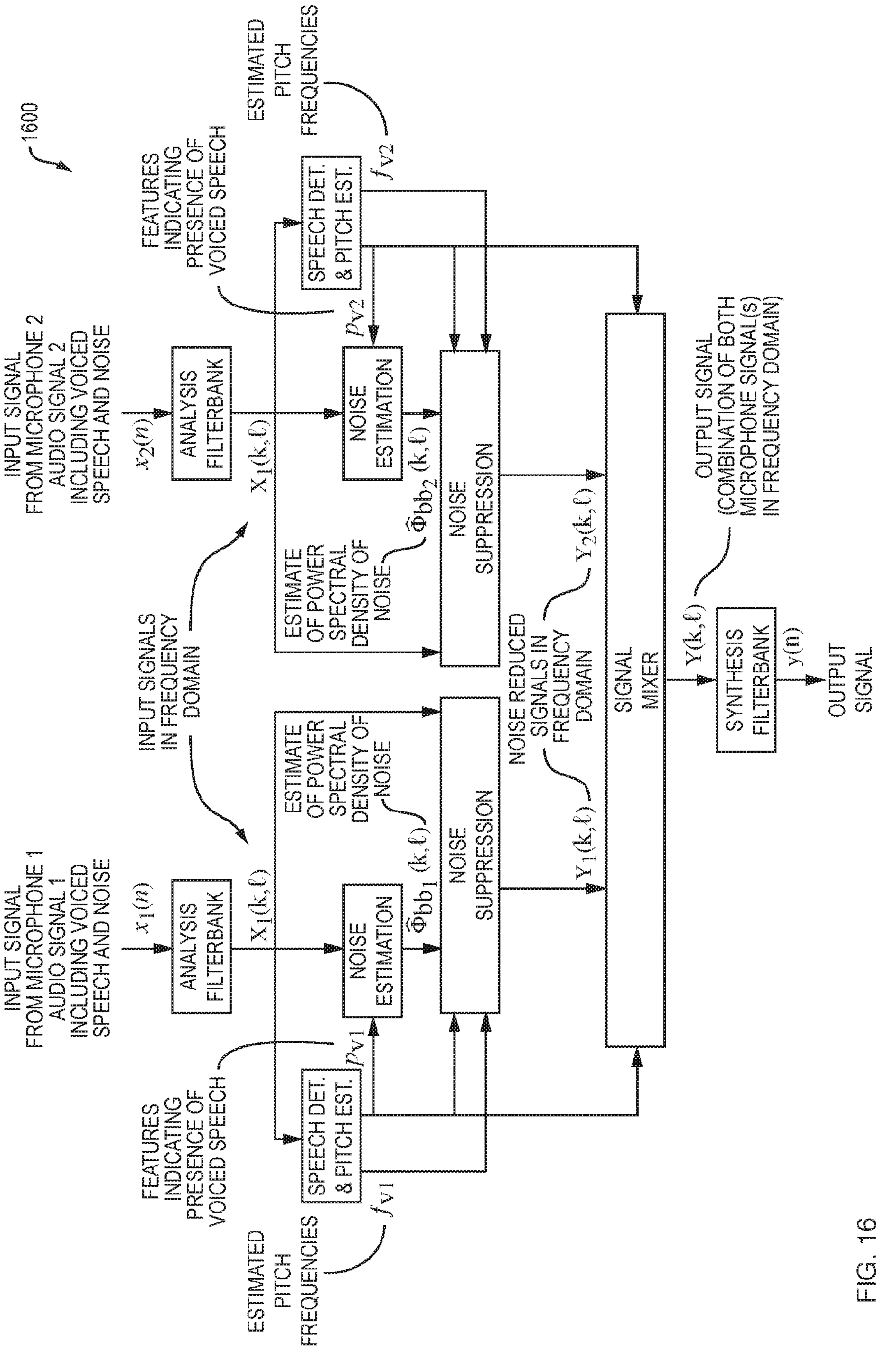
FIG. 16 is block diagram of an example embodiment of an ICC system configured to perform speech enhancement based on speech and pitch detection.

FIG. 16 is block diagram 1600 of an example embodiment of an ICC system configured to perform speech enhancement based on speech and pitch detection.

Figure 17:
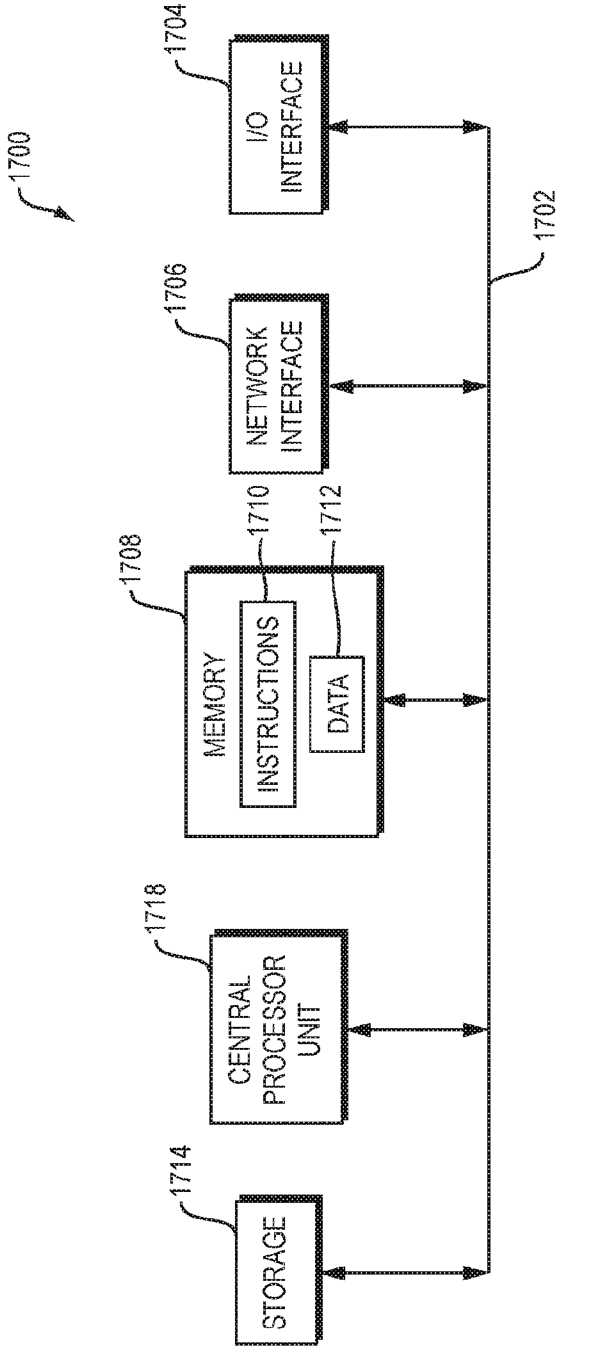
FIG. 17 is a block diagram of an example internal structure of a computer optionally within an embodiment disclosed herein.

FIG. 17 is a block diagram of an example of the internal structure of a computer 1700 in which various embodiments of the present disclosure may be implemented. The computer 1700 contains a system bus 1702, where a bus is a set of hardware lines used for data transfer among the components of a computer or processing system. The system bus 1702 is essentially a shared conduit that connects different elements of a computer system (e.g., processor, disk storage, memory, input/output ports, network ports, etc.) that enables the transfer of information between the elements. Coupled to the system bus 1702 is an I/O device interface 1704 for connecting various input and output devices (e.g., keyboard, mouse, displays, printers, speakers, etc.) to the computer 1700. A network interface 1706 allows the computer 1700 to connect to various other devices attached to a network. Memory 1708 provides volatile storage for computer software instructions 1710 and data 1712 that may be used to implement embodiments of the present disclosure. Disk storage 1714 provides non-volatile storage for computer software instructions 1710 and data 1712 that may be used to implement embodiments of the present disclosure. A central processor unit 1718 is also coupled to the system bus 1702 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 12, disclosed above, or equivalents thereof, firmware, a combination thereof, or other similar implementation determined in the future. For example, the speech detector 1220 and the audio enhancer 1222 of FIG. 12, disclosed above, may be implemented in software or hardware, such as via one or more arrangements of circuitry of FIG. 17, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for voice quality enhancement in an audio communications system, the method comprising:

monitoring for a presence of voiced speech in an audio signal including the voiced speech and noise captured by the audio communications system, at least a portion of the noise being at frequencies associated with the voiced speech, the monitoring including computing phase differences between respective frequency domain representations of present audio samples of the audio signal in a present short window and of previous audio samples of the audio signal in at least one previous short window;

determining whether the phase differences computed between the respective frequency domain representations are substantially linear over frequency; and detecting the presence of the voiced speech by determining that the phase differences computed are substantially linear and, in an event the voiced speech is detected, enhancing voice quality of the voiced speech communicated via the audio communications system by applying speech enhancement to the audio signal.

2. The method of claim 1, wherein the present and at least one previous short window have a window length that is too short to capture audio samples of a full period of a periodic voiced excitation impulse signal of the voiced speech in the audio signal.

3. The method of claim 2, wherein the audio communications system is an in-car-communications (ICC) system and the window length is set to reduce audio communication latency in the ICC system.

4. The method of claim 1, further comprising estimating a pitch frequency of the voiced speech, directly in a frequency domain, based on the presence being detected and the phase differences computed.

5. The method of claim 1, wherein the computing includes:

computing a weighted sum over frequency of phase relations between neighboring frequencies of a normalized cross-spectrum of the respective frequency domain representations;

computing a mean value of the weighted sum computed; and wherein the determining includes comparing a magnitude of the mean value computed to a threshold value representing linearity to determine whether the phase differences computed are substantially linear.

6. The method of claim 5, wherein the mean value is a complex number and, in the event the phase differences computed are determined to be substantially linear, the method further comprises estimating a pitch period of the voiced speech, directly in a frequency domain, based on an angle of the complex number.

7. The method of claim 5, further including:

comparing the mean value computed to other mean values each computed based on the present short window and a different previous short window; and estimating a pitch frequency of the voiced speech, directly in a frequency domain, based on an angle of a highest mean value, the highest mean value selected from amongst the mean value and other mean values based on the comparing.

8. The method of claim 5, wherein computing the weighted sum includes employing weighting coefficients at frequencies in a frequency range of voiced speech and applying a smoothing constant in an event the at least one previous frame includes multiple frames.

9. The method of claim 1, further comprising estimating a pitch frequency of the voiced speech, directly in a frequency domain, based on the presence being detected and wherein:

the computing includes computing a normalized cross-spectrum of the respective frequency domain representations; and the estimating includes computing a slope of the normalized cross-spectrum computed and converting the slope computed to the pitch period.

10. The method of claim 1, wherein the method further comprises:

estimating a pitch frequency of the voiced speech, directly in a frequency domain, based on the presence being detected and the phase differences computed; and applying an attenuation factor to the audio signal based on the presence not being detected, wherein the speech enhancement includes reconstructing the voiced speech based on the pitch frequency estimated, disabling noise tracking, applying an adaptive gain to the audio signal, or a combination thereof.

11. An apparatus for voice quality enhancement in an audio communications system, the apparatus comprising:

an audio interface configured to produce an electronic representation of an audio signal including voiced speech and noise captured by the audio communications system, at least a portion of the noise being at frequencies associated with the voiced speech; and a processor coupled to the audio interface, the processor configured to implement a speech detector and an audio enhancer, the speech detector coupled to the audio enhancer and configured to:

monitor for a presence of the voiced speech in the audio signal, the monitor operation including computing phase differences between respective frequency domain representations of present audio samples of the audio signal in a present short window and of previous audio samples of the audio signal in at least one previous short window;

determine whether the phase differences computed between the respective frequency domain representations are substantially linear over frequency; and detect the presence of the voiced speech by determining that the phase differences computed are substantially linear and communicate an indication of the presence to the audio enhancer, the audio enhancer configured to enhance voice quality of the voiced speech communicated via the audio communications system by applying speech enhancement to the audio signal, the speech enhancement based on the indication communicated.

12. The apparatus of claim 11, wherein the present and at least one previous short window have a window length that is too short to capture audio samples of a full period of a periodic voiced excitation impulse signal of the voiced speech in the audio signal, wherein the audio communications system is an in-car-communications (ICC) system, and wherein the window length is set to reduce audio communication latency in the ICC system.

13. The apparatus of claim 11, wherein the speech detector is further configured to estimate a pitch frequency of the voiced speech, directly in a frequency domain, based on the presence being detected and the phase differences computed.

14. The apparatus of claim 11, wherein the compute operation includes:

computing a weighted sum over frequency of phase relations between neighboring frequencies of a normalized cross-spectrum of the respective frequency domain representations;

computing a mean value of the weighted sum computed; and wherein the determining operation includes comparing a magnitude of the mean value computed to a threshold value representing linearity to determine whether the phase differences computed are substantially linear.

15. The apparatus of claim 14, wherein the mean value is a complex number and, in the event the phase differences computed are determined to be substantially linear, the speech detector is further configured to estimate a pitch period of the voiced speech, directly in a frequency domain, based on an angle of the complex number.

16. The apparatus of claim 14, wherein the speech detector is further configured to:

compare the mean value computed to other mean values each computed based on the present short window and a different previous short window; and estimate a pitch frequency of the voiced speech, directly in a frequency domain, based on an angle of a highest mean value, the highest mean value selected from amongst the mean value and other mean values based on the compare operation.

17. The apparatus of claim 14, wherein to compute the weighted sum, the speech detector is further configured to employ weighting coefficients at frequencies in a frequency range of voiced speech and apply a smoothing constant in an event the at least one previous frame includes multiple frames.

18. The apparatus of claim 11, wherein the speech detector is further configured to estimate a pitch frequency of the voiced speech, directly in a frequency domain, based on the presence being detected and wherein the compute operation includes computing a normalized cross-spectrum of the respective frequency domain representations and wherein the estimation operation includes computing a slope of the normalized cross-spectrum computed and converting the slope computed to the pitch period.

19. The apparatus of claim 11, wherein the speech detector is further configured to estimate a pitch frequency of the voiced speech, directly in a frequency domain, based on the presence being detected and the phase differences computed and communicate the pitch frequency estimated to the audio enhancer and wherein the audio enhancer is further configured to apply an attenuation factor to the audio signal based on the indication indicating the presence not being detected, wherein the speech enhancement includes reconstructing the voiced speech based on the pitch frequency estimated and communicated, disabling noise tracking, applying an adaptive gain to the audio signal, or a combination thereof.

20. A non-transitory computer-readable medium for voice quality enhancement in an audio communications system, the non-transitory computer-readable medium having encoded thereon a sequence of instructions which, when loaded and executed by a processor, causes the processor to:

monitor for a presence of voiced speech in an audio signal including voiced speech and noise captured by the audio communications system, at least a portion of the noise being at frequencies associated with the voiced speech, the monitor operation including computing phase differences between respective frequency domain representations of present audio samples of the audio signal in a present short window and of previous audio samples of the audio signal in at least one previous short window;

determine whether the phase differences computed between the respective frequency domain representations are substantially linear over frequency; and detect the presence of the voiced speech by determining that the phase differences computed are substantially linear and, in an event the voiced speech is detected, enhance voice quality of the voiced speech communicated via the audio communications system by applying speech enhancement to the audio signal.

* * * * *